(12) United States Patent
Wong et al.

(10) Patent No.: US 7,446,772 B2
(45) Date of Patent: *Nov. 4, 2008

(54) SPECTATOR EXPERIENCE FOR NETWORKED GAMING

(75) Inventors: Curtis G. Wong, Bellevue, WA (US);
Steven Drucker, Bellevue, WA (US);
Michael F. Cohen, Seattle, WA (US);
Steven D. De Mar, Redmond, WA (US);
Asta L. Glatzer, Redmond, WA (US);
Li-Wei He, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 11/311,870

(22) Filed: Dec. 19, 2005

(65) Prior Publication Data
US 2006/0098013 A1 May 11, 2006

Related U.S. Application Data

(63) Continuation of application No. 09/934,717, filed on Aug. 22, 2001, now Pat. No. 6,999,083.

(51) Int. Cl.
*G06T 15/00* (2006.01)
(52) U.S. Cl. .......................... 345/473; 345/952; 463/31; 463/42
(58) Field of Classification Search .................. 345/473, 345/752, 474, 475, 952; 463/33, 42, 31
See application file for complete search history.

(56) References Cited

U.S. PATENT DOCUMENTS 5,774,668 A 6/1998 Choquier et al. ....... 395/200.53
5,850,352 A * 12/1998 Moezzi et al. .............. 345/419
5,926,179 A * 7/1999 Matsuda et al. ............. 715/752
6,040,841 A 3/2000 Cohen et al. ................ 345/473
6,325,717 B1 * 12/2001 Kawagoe et al. ............. 463/33
6,352,479 B1 * 3/2002 Sparks, II .................... 463/42

FOREIGN PATENT DOCUMENTS

WO  WO 98/46029 A  10/1998

(Continued)

OTHER PUBLICATIONS

Otten, "Broadcasting Virtual Games in the Internet". Jun. 2001, pp. 1-7.*

(Continued)

*Primary Examiner*—Phu K Nguyen
(74) *Attorney, Agent, or Firm*—Amin, Turocy & Calvin, LLP

(57) ABSTRACT

A spectator experience corresponding to an occurrence of one or more games or events is generated based on each associated occurrence. The occurrence of a game or event varies in response to contributions and/or interactions of one or more participants of the game or event. The spectator experience enables users thereof to observe an augmented version of the game or event, such as by implementing enhanced viewpoint controls and/or other spectator related effects. In a particular aspect, the spectator experience can provide an indication of the spectator' presence, which is made available to the spectators and/or to the participants of the game.

20 Claims, 15 Drawing Sheets

FOREIGN PATENT DOCUMENTS

WO      WO 01/75545 A     10/2001

OTHER PUBLICATIONS

Vronay, D., et al.; Streaming Media Interfaces for Chat; Virtual Worlds Group; Microsoft Research, p. 1-7, 1996.

[He96] Li-we He, et al.; Virtual Cinematographer: A Paradigm for Automatic Camera Placement and Directing; in proceedings of SIGGRAPH 96 Paper, 1996.

[Drucker 94] Drucker, Steven; Intelligent Camera Control for Graphical Environments; Ph.D. dissertation, MIT Media Lab, 1994.

[Forrester00] Pervasive Gaming Goes Mainstream; The Forrester Report, Aug. 2000.

John "JCal" Callaham; Valve's Multicast Tech Interview; Z-Axis; Apr. 13, 2001, p. 1.

S. Arnold; European Search Report, EP02016425; Munich, Jul. 13, 2004.

* cited by examiner

SPECTATOR EXPERIENCE FOR NETWORKED GAMING

CROSS-REFERENCE TO RELATED APPLICATIONS

This application is a Continuation of pending U.S. patent application Ser. No. 09/934,717 entitled "SYSTEM AND METHOD TO PROVIDE A SPECTATOR EXPERIENCE FOR NETWORKED GAMING" and filed Aug. 22, 2001. The entirety of the above-noted application is incorporated by reference herein.

BACKGROUND

The entertainment industry offers a variety of passive and interactive forms of amusement, which often are tailored depending on the target audience. For example, different video games are specifically marketed to specific target age groups, as are television programs. With advances in computer-based technology, there has been a tendency of video games to emulate television (TV) programs. In fact, there often is significant crossover between video games and television. For example, some video games later become the subject of television programs and/or full-length feature movies. Other computer video games are based on television programs and movies. Despite the similarities in subject matter, there is little interaction between the video games and associated programs. Typically, one can either be a participant of the video game or a passive viewer of a television program or movie.

Many video games are equipped with multiplayer capabilities that can be accessed over a network, such as the Internet. Networked multiplayer games are becoming tremendously popular, attracting gamers of a variety of ages. Traditional board and card games are also increasingly being played online and are likely to continue to gain popularity. Due to the status of such games, game manufacturers are devoting considerable time and money into increasing their share of this expanding market. Efforts also have been made to make television a more interactive experience.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method that generates a spectator experience corresponding to an occurrence of an associated game or event. The spectator experience can be generated in real time as a function of the associated game or event. Alternatively or additionally, the spectator experience could include portions of a prior occurrence of an associated game or event, such as to provide highlights, instant replays, or other enhancements for the resulting spectator experience. Each occurrence of a game or event varies over time in response to contributions and/or interactions of one or more participants (e.g., players) of each respective game or event.

According to one aspect of the present invention, the spectator experience includes a representation of at least part of an associated occurrence of a game or event. By way of example, the spectator experience can include an audio and/or visual representation of spectator data corresponding to a selected part of the associated occurrence. The part of the associated occurrence that forms the spectator data can be based on interactions and/or contributions of participants of the occurrence. The participants may be human and/or computer-generated participants, with each participant affecting the associated occurrence. The game and, in turn, the spectator experience vary as a function of participant interactions and/or other contributions to the game, which can be based on real time spectator activity.

In another aspect, the spectator data, which is employed to generate the spectator experience, includes other information associated with the occurrence of the game or event. Such other information may be presented as part of an audio and/or visual representation of the spectator experience. By way of illustration, the other information could include information about the participants (e.g., how many, who they are, statistical data, etc.), information about at least some of the spectators of the associated occurrence (e.g., how many, who they are, etc.), commentary about the associated occurrence, related commercial services (e.g., online stores, special offers, etc.), and/or links to other relevant information. The spectator data further can include enhancements to the presentation of the associated occurrence.

The spectator experience also may include user interface elements that enable a spectator to customize his or her spectator experience. For example, a spectator can control one or more virtual cameras to select desired viewpoints, based on which a corresponding visual representation of the occurrence can be generated. Alternatively or additionally, automated camera control can be utilized to select an optimized representation of the occurrence, such as based on the interactions and/or contributions of participants.

Another aspect of the present invention provides an infrastructure or portal (e.g., a Website) to access spectator related services. The portal may provide information about the occurrence of one or more games or events. By way of illustration, the portal may include a user interface, which presents information about available occurrences. The available occurrences can correspond to real time games or events or to delayed versions of games or events. The portal also can include visual and/or audio information about the available occurrences including, for example, identifying the name for each game or event, the number of active participants, the number of spectators, etc. The portal further includes user interface elements that can be activated to connect to a spectator experience corresponding to a desired occurrence of a game or event.

Yet another aspect of the present invention provides a method to provide a spectator experience for a user. The method includes receiving game information corresponding to an occurrence of the game or event, which has at least one participant thereof. Portions of the game information are selected for incorporation into the spectator experience associated with the occurrence of such game or event. The selected portions of the game information and other spectator information are aggregated to provide aggregated spectator data that is transformable into a representation of the spectator experience associated with the occurrence of the game or event. Additionally or alternatively, the spectator data can be processed or enhanced, such as to delete non-interesting events, summarize selected parts of the occurrence, provide instant replays, and/or provide special effects to augment graphics or otherwise provide a more exciting spectator experience. The method can be implemented as computer executable instructions, which may run on one or more computers to provide the spectator experience.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION

Figure 1:
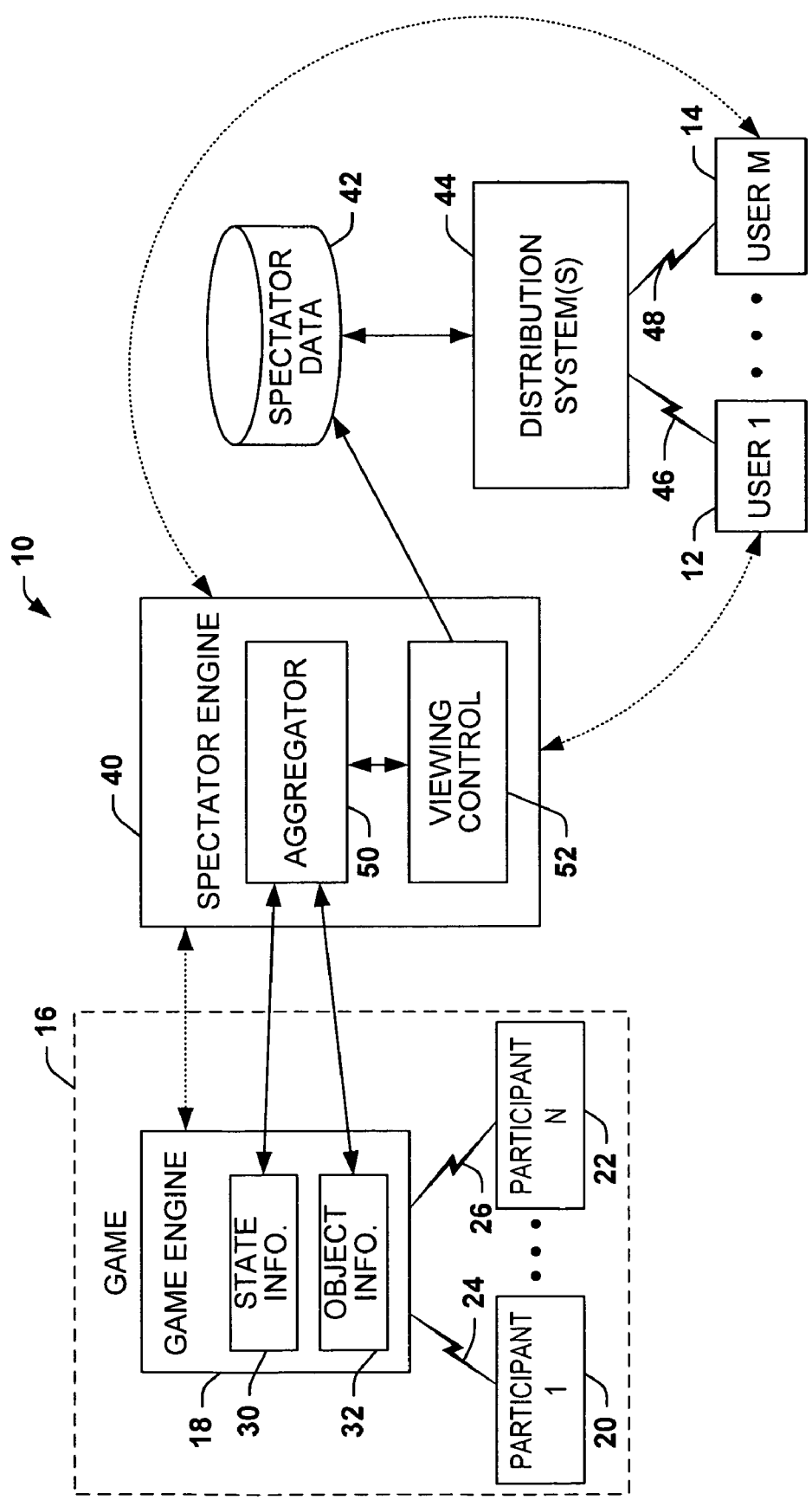
FIG. 1 is functional block diagram illustrating a spectator system in accordance with an aspect of the present invention.

FIG. 1 illustrates an example of a system 10 operative to provide a spectator experience to one or more users (USER 1 through USER M, where M is a natural number) 12 and 14 in accordance with an aspect of the present invention. The system 10 includes an occurrence of a game or event 16. For purposes of simplicity of explanation, the occurrence of a game or event is hereinafter referred to as a "game", although it is to be appreciated that the present invention is not limited to games. The game 16 can include a live, real time occurrence and/or be based on stored data for a previous occurrence thereof.

The game 16 includes a game engine 18 with which one or more participants 20 and 22 can interact with other participants and/or with items that form part of the environment within the game. The participants 20 and 22 are indicated as "PARTICIPANT 1" to "PARTICIPANT N", where N is natural number greater than or equal to 1. It is to be appreciated that the participants 20 and 22 can be associated with live persons and/or be computer implemented and controlled.

By way of example, the game engine 18 is implemented as a process running at one or more computers programmed to facilitate interaction between participants 20 and 22 and the game 16. The participants 20 and 22 are coupled to the game engine 18 through respective communication links 24 and 26. The links 24 and 26 can be direct or indirect connections, such as through one or more proxy servers. Each participant 20, 22 provides instructions to the game engine 18 that indicate a manner in which each respective participant is to interact with the game. Such instructions affect the game 16, including the relationship of participants 20 and 22 and other attributes of the game. The game engine 18, for example, includes one or more interfaces that expose methods and/or functions associated with the game 16. The interfaces enable participants 20 and 22 to communicate with the game 16, such as by a corresponding process running at each participant that facilitates communication of game data between the participant process and the game engine 18.

By way of further illustration, the game engine 18 includes state information 30 and object information 32. The state information 30 includes parameters, which have values that define the status and relationship of the participants 20 and 22 relative to the game 16. The state information 30 is continually updated as a function of time in response to instructions received (and/or the absence of instructions) from the participants 20 and 22. The state information 30 further can include a time stamp to facilitate synchronization of game data for each of the participants 20, 22. The state information 30, for example, can include a relative game time (e.g., via the time stamp), the relative position or condition of the participants 20 and 22 (e.g., health, strength, abilities, etc.), historical or biographical information, etc. The object information 32 provides information about the geometry of the game 16. The object geometry, for example, can identify the relative position of participants 20 and 22, and other items and features associated with the game 16.

The object information 32 together with the state information 30 (or relevant selected portions thereof) can be provided to each participant 20, 22 to help render an animated representation of the game for each respective participant. Corresponding audio information also can be generated for each participant 20, 22 based on the state and object information 30 and 32 and instructions provided at the participants.

The system 10 also includes a spectator engine 40 in accordance with an aspect of the present invention. The spectator engine 40, for example, includes a process running on one or more computers (e.g., a server) that operatively communicates with the game engine 18, such as through interfaces of the game engine. The spectator engine 40 receives information indicative of the occurrence of the game 16, based on which it can generate spectator data 42 that may be provided to the spectators 12 and 14. In particular, one or more distribution systems 44 may employ the spectator data to, in turn, distribute (or broadcast) a corresponding signal to the spectators 12 and 14 based on the spectator data. The spectators 12 and 14 receive the distributed spectator information from associated distribution system 44 via communication links 46 and 48. The communications links 46 and 48, for example, can be direct connections, such as wired (e.g., optical or electrically conductive) or wireless connections, or indirect connections through one or more proxies. The links 46 and 48 also could be unidirectional or bidirectional communications channels.

By way of further example, the spectator engine 40 includes an aggregator 50 that receives the state information 30 and the object geometry information 32 from the game engine 18. As mentioned above, the state information 30 and object information 32 collectively indicate where all the players are, the condition of the game environment and players, as well as other attributes associated with the occurrence of the game. Such information is sufficient to reconstruct the game 16, including audio and video features for each of the players. As a result, the spectator engine 40 can provide the spectator data 42, based on which a representation of the spectator experience can be generated at the spectators 12 and 14.

A viewing control component 52 is coupled to the aggregator 50 to receive the aggregated game data. The viewing control 52 processes the aggregated data to provide enhanced spectator data. In one aspect of the present invention, the viewing control 52 can implement virtual camera control in which a plurality of virtual cameras are utilized to provide a cinematic features, such as to provide spectators with desirable viewing angles. For example, the virtual cameral control can automatically select virtual cameras, such as based on preprogrammed cinematographic algorithms, or manually, such as based on instructions from an authorized person or spectator (e.g., a human director). In addition, a spectator 12, 14 could employ virtual camera control to select a desired viewpoint to observe the occurrence of the game. For example, a spectator can select to move between different virtual cameras, to couple the virtual camera with one or more participants of the game 16, or implement an automatic camera control based on designated spectator preferences.

The virtual camera of the viewing control 52 also can be loosely coupled with a participant, such as to follow that participant's activities in the game. In certain types of games, for example, an over the shoulder view of a selected player can be utilized to visualize part of the game from the perspective of that player. The viewing control 52 further can dampen motion of the participant in the representation provided to the spectators 12 and 14 so as to mitigate quick jerky movements, which are not visually pleasing.

In accordance with an aspect of the present invention, the spectator engine 40 also can provide an indication (or representation) of the spectator audience in the spectator data 42. For example, a spectator consciousness can include presenting an indication (e.g., audio and/or visual) of the spectators of the game 16. This can include an indication about the number of spectators in the audience. Additionally or alternatively, a group of spectators further can be associated with each other, such as through a messaging service, to enable communication between such spectators during the spectator experience for the game 16. Accordingly, the spectators 12 and 14 can be more than passive observers of the game isolated from the other spectators. Instead, spectators can "feel" the presence of other spectators, have side conversations, etc.

In accordance with another aspect of the present invention, an indication of some or all spectators can be fed back to the participants 20 and 22 through the spectator engine 40. The indication can be provided to the participants 20 and 22 based on corresponding parameters of the state information 30, which are updated based on the number of spectators. By way of example, the indication can be a graphical, textual, and/or audible indication of the number of spectators in the spectator audience. The identity of certain spectators also could be revealed to selected participants during the game 16, such as based on a messaging system in which the selected participants have been previously associated with the spectators. That is, the spectator engine 40 can interface with the game engine 18 in a manner similar to the participants 20 and 22, but collectively representing the spectators 12 and 14 of the game 16 by updating state and object information 30 and 32 based on the presence and/or interactions of the spectators. As a result, the game experience provided to the participants 20 and 22 and/or the spectator experience provided to the spectators 12 and 14 can simulate a live game or event. That is, both the game and the spectator experience can implement features that cause the spectators and participants to be aware of each other.

In situations when the broadcast of the game 16 by the distribution system 44 is offline (e.g., a delayed transmission), a postproduction phase could be utilized to further enhance the spectator experience. For example, improved animation and rendering could be implemented, which otherwise might not be available in a real time processing. Editing, highlights and/or fanciful replays also could be used. In such circumstances, the features relating to audience awareness and interactions between associated spectators can still enrich the spectator experience beyond a passive experience.

Various possible architectures exist in which the system 10 could be implemented in accordance with an aspect of the present invention. Even within a given architecture, more than one possible implementation might exist. Typically, the architecture and implementation therein, will be driven by bandwidth considerations associated with the communication links by which the participants 20 and 22 and the spectators 12 and 14 receive and/or transmit information.

By way of illustration, in a high bandwidth environment, the entire spectator experience including graphical and/or audio elements can be rendered from the spectator data 42 and then be transmitted over the distribution system(s) 44 to the spectators 12 and 14. In other circumstances, partial rendering may occur at the spectators 12 and 14 and prior to transmission from the distribution system 44. Some of the logic and graphical features further could be transmitted to the spectators 12 and 14 to facilitate generation of the spectator experience at the spectators 12 and 14. In low bandwidth environments, it may be desirable to store most of the logic and graphical elements operative to generate the game environment at the spectators 12 and 14 (e.g., in CD ROM, DVD, hard disk drive, etc.), such that appropriate graphical and/or audio data can be accessed from such stored data to more rapidly create the spectator experience based on the spectator data. Alternatively or additionally, the spectators 12, 14 could employ game consoles, such as are operative to connect to the Internet or other communication frameworks. In another aspect, the spectators 12 and 14 could include televisions that receive the spectator experience as conventional broadcast data (e.g., broadband cable, digital cable, satellite, streaming, etc.). It is to be appreciated that a spectator could employ more that one communications infrastructure to communicate data that creates the spectator experience.

Figure 2:
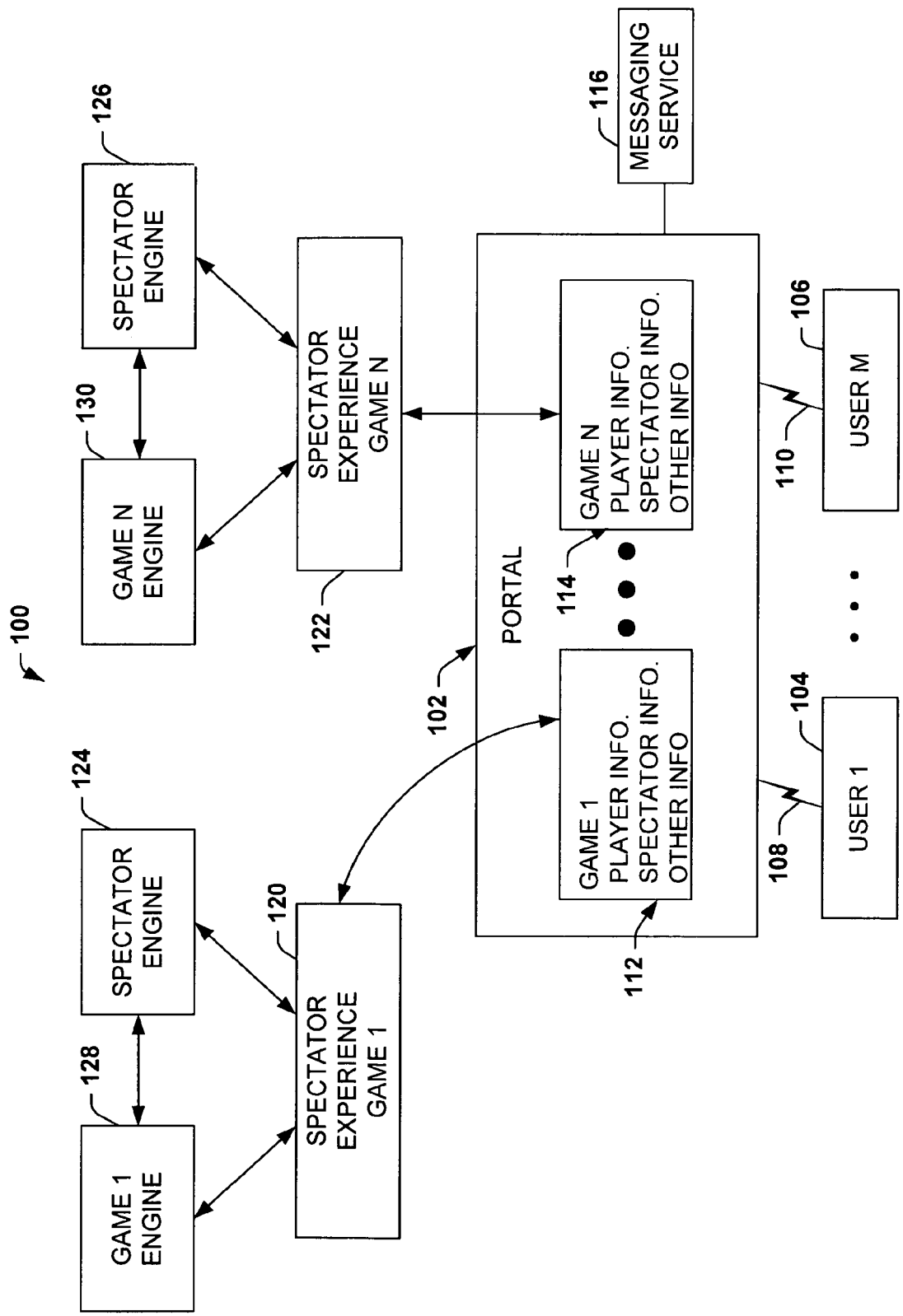
FIG. 2 is a functional block diagram illustrating another spectator system in accordance with an aspect of the present invention.

FIG. 2 illustrates an example of a system 100 that facilitates accessing spectator experiences for more than one game in accordance with an aspect of the present invention. The system 100 includes a portal 102, which may be a Website or other service, to which one or more users 104 and 106 (USER 1 to USER M, where M is a natural number) may connect. The users 104 and 106, for example, can include any microprocessor-based device (e.g., PC, workstation, handheld appliance, entertainment or game console, etc.). The users 104 and 106 connect to the portal 102 via associated communication channels 108 and 110. The communication channels 108 and 110 could be direct or indirect connections and can implement wired and/or wireless communication protocols over any communications framework.

In accordance with an aspect of the present invention, the portal 102 provides information 112 and 114 about one or more games, indicated as GAME 1 to GAME N, wherein N is a natural number greater than or equal to one. In essence, the portal 102 operates as a spectator of each of the games GAME 1 to GAME N. That is, it extracts information from spectator experiences for GAME 1 to GAME N (and/or directly from such games) and presents the information at a single location (e.g., the portal) to facilitate access to the information about associated spectator experiences GAME 1 to GAME N.

By way of illustration, the game information 112 and 114 can identify games by name. The game information also can include information about the participants of the games, such as statistical information, an identification of the players by name (or by alias). Spectator information also can indicate the number of spectators.

In certain circumstances, the spectator information 112, 114 further can indicate the identity of selected spectators. The portal 102 can employ an existing messaging service 116 in combination with the game information to locate and identify other spectators and/or participants that are associated with each other through the messaging service. For example, specific participants and/or spectators may be identified to selected users 104, 106 of the portal 102, such as according to a public key shared between the selected users and the specific participants and/or spectators. The identification of particular participants and/or spectators further facilitates instant messaging by which mutually identified users of the portal can communicate with each other. Similarly, users of the spectator experience can employ the messaging service 116 to provide other users links to active spectator experiences and or commentary about the games themselves. Such an arrangement also affords spectator participation, such as in the form of audience feedback, although spectator participation could be implemented using other techniques.

In accordance with an aspect of the present invention, the game information 112 and 114 is provided based on information collected from (or provided by) associated spectator experiences 120 and 122. The spectator experiences 120 and 122, for example, include real time distribution (or broadcast) of spectator information pertaining to GAME 1 and GAME N. Accordingly, as each game GAME 1, GAME N progresses, the game information 112, 114 is updated, such as at periodic intervals or continuously. It is to be appreciated that the real time distribution of the game can be of a live or delayed occurrence of the game.

Each spectator experience 120, 122 is produced based on spectator data provided by a spectator engine 124, 126 in conjunction with game data provided by a game engine 128, 130 for each corresponding game GAME 1, GAME N. The spectator engine 120, 122 aggregates game data from the game engine 128, 130 and implements selected viewing controls to provide corresponding spectator data. The spectator data is then rendered (e.g., before and/or after its distribution) to provide graphics and/or audio associated with the spectator experience 120, 122. It is to be appreciated that the resulting representation of a spectator experience 120, 122 can be customized, such as based on user preferences and spectator parameters selected by respective spectators.

In accordance with an aspect of the present invention, the portal 102 also provides a link to facilitate access to the spectator experiences 120 and 122 identified at the portal. For example, the game information 112 and 114 include user interface elements that can be selected by the users 104 and 106 to redirect the users to the location of the associated spectator experiences 120 and 122.

Figure 3:
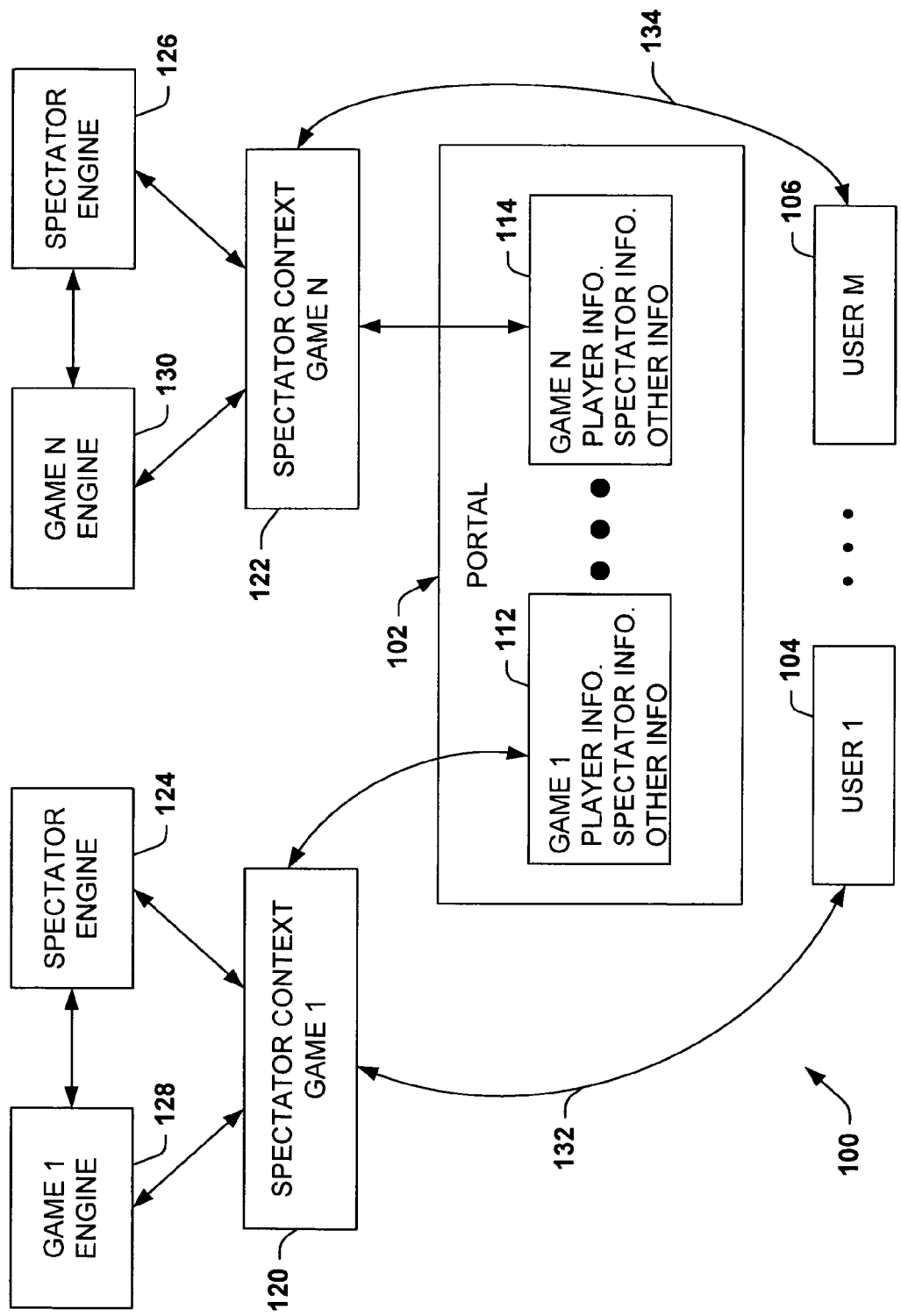
FIG. 3 is a functional block diagram, similar to FIG. 2, illustrating the system in another condition in accordance with an aspect of the present invention.

FIG. 3 illustrates another condition of the system 100 of FIG. 2, in which identical reference characters refer to features previously identified with respect to FIG. 2. In FIG. 3, the user 104 is connected to the spectator experience 120 of GAME 1 via communications link 132 and the user 106 is connected to the spectator experience 122 of GAME N via communications link 134. It is to be appreciated that any number of users can access any of the spectator experiences 120 and 122 via the portal 102. Further, a user could log on to more than spectator experience concurrently. When a user 104, 106 logs on (or connects) to a spectator experience 120, 122, that user becomes a spectator and the corresponding game and spectator information 112 and 114 at the portal 102 is adjusted accordingly.

Figure 4:
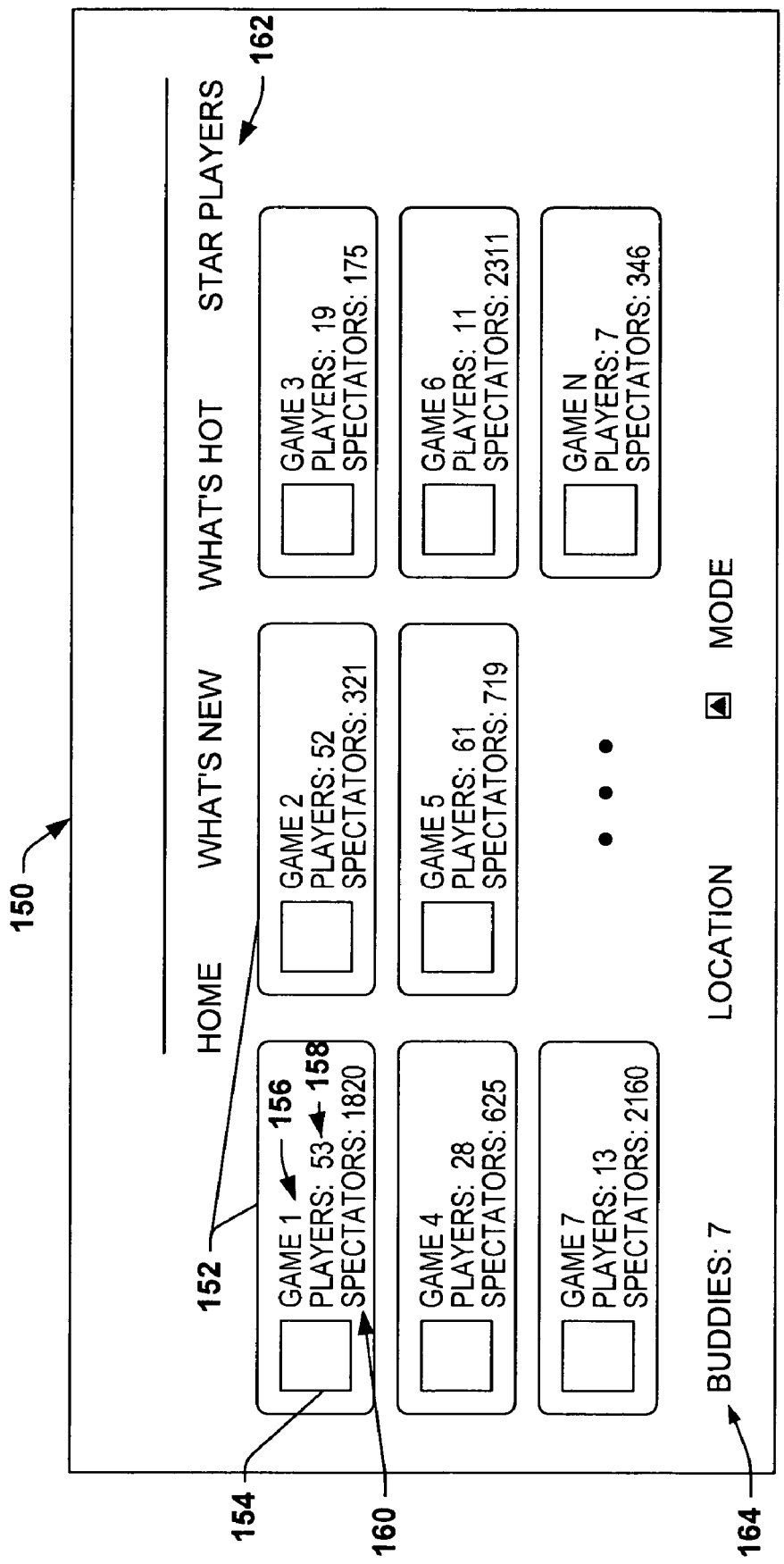
FIG. 4 is an example of a user interface that may be utilized in conjunction with a spectator system in accordance with an aspect of the present invention.
Figure 5:
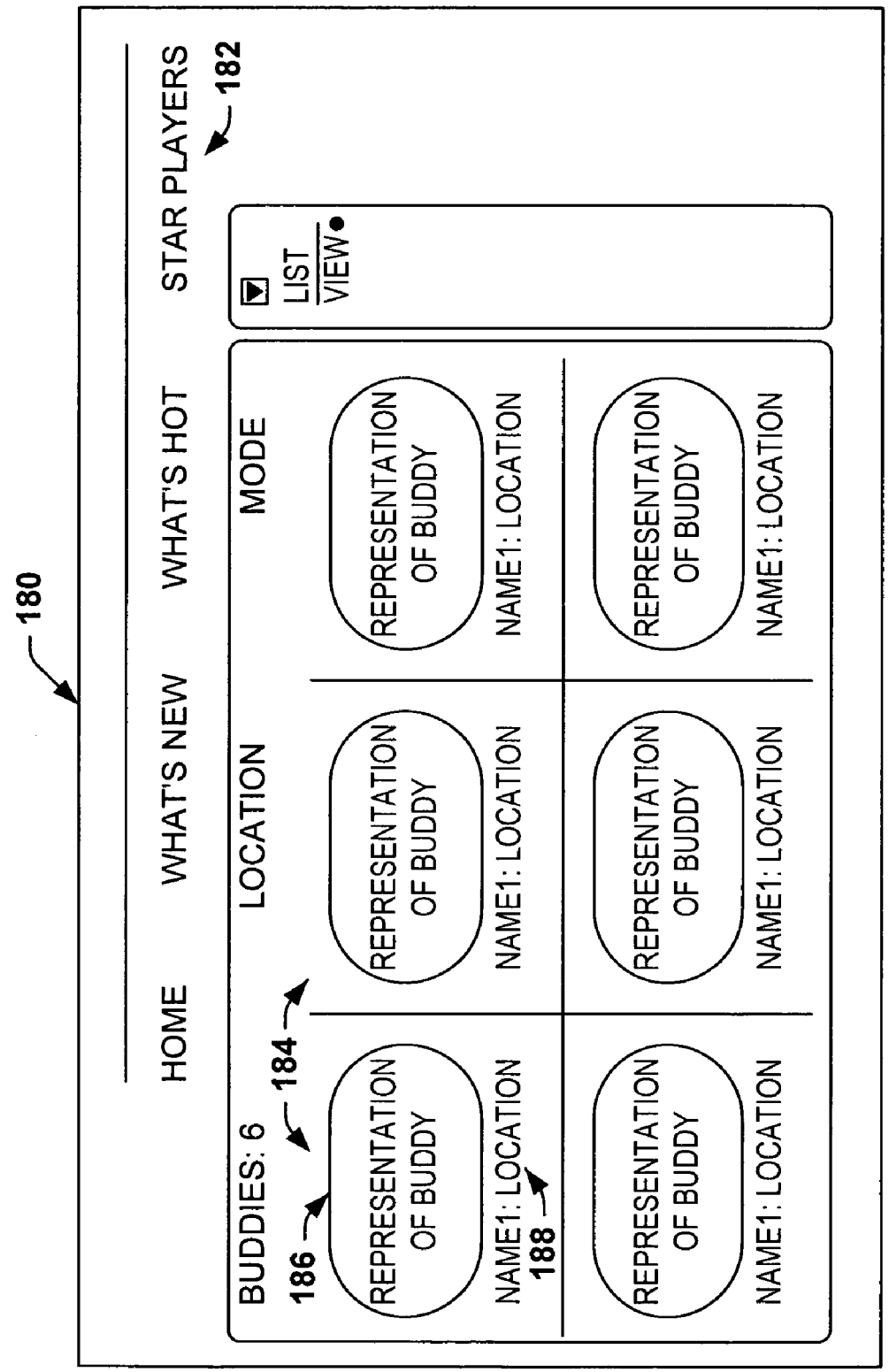
FIG. 5 is an example of another user interface that may be utilized in conjunction with a spectator system in accordance with an aspect of the present invention.
Figure 6:
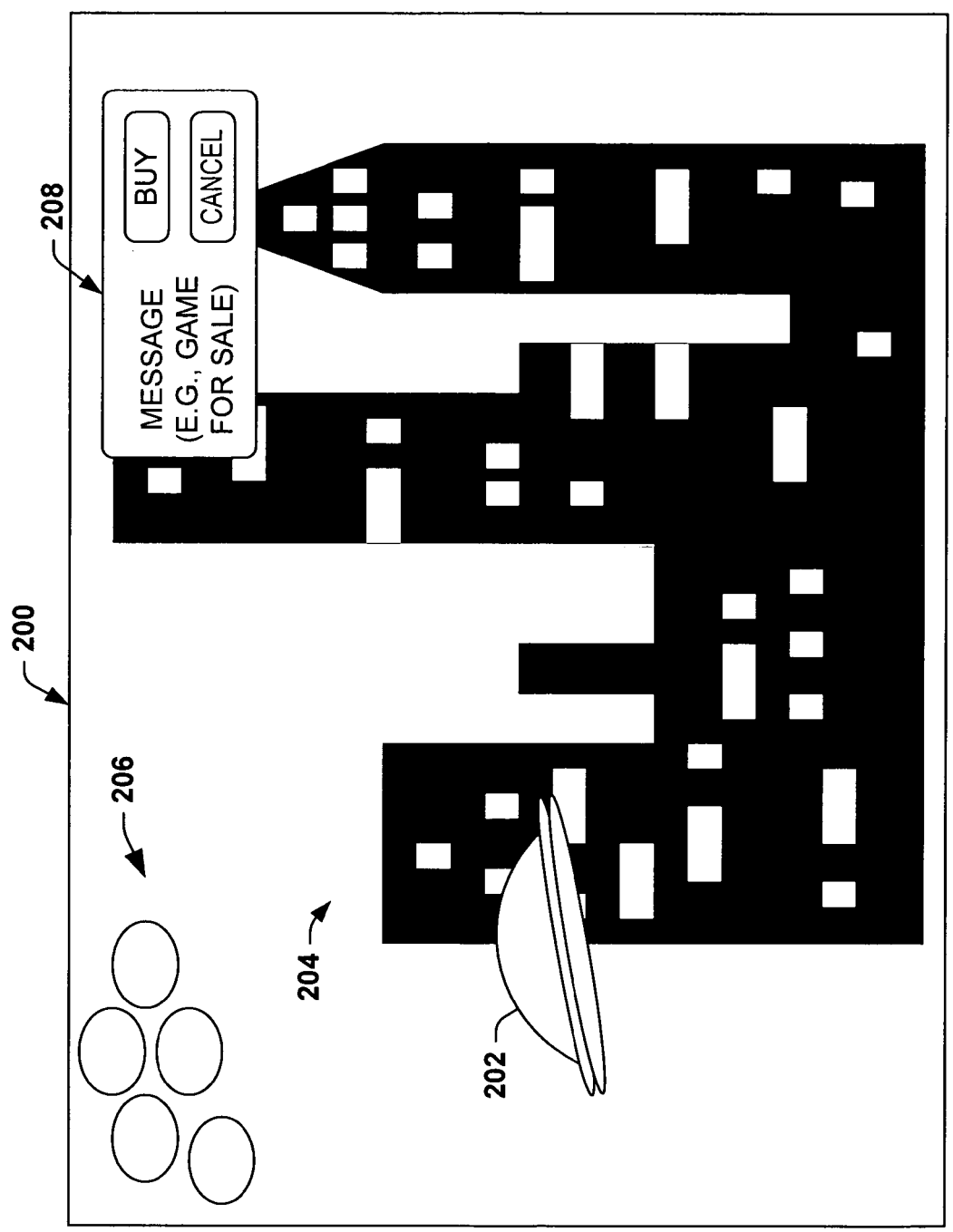
FIG. 6 is a diagrammatic visual representation of a multi-user spectator experience in accordance with an aspect of the present invention.

FIGS. 4, 5, and 6 are examples of graphical representations that could be employed to implement various aspects of a portal and/or spectator experience in accordance with an aspect of the present invention. The graphics could be provided at websites, for example, which can be accessed from a remote computer, a handheld appliance, a game console, etc. It is to be appreciated that the illustrated graphical representations are for purposes of simplicity of explanation and that any configuration of display and graphical user interface may be implemented in accordance with an aspect of the present invention.

Referring to FIG. 4, an example of a graphical user interface 150 for a portal is illustrated. As mentioned, the portal may be implemented at a Website that collects information from and spectator experiences associated with games and/or from one or more games. The interface 150 includes a plurality of user interface elements 152, each associated with a different occurrence of a game. That is, more than one occurrence of a given game can exist concurrently.

By way of example, each user interface element 152 can present a variety of information about the occurrence of the associated game, including an image 154 for the game, the name of the game 156, the number of players 158, and the number of spectators 160. Each item of information 154-160 further can be implemented as a user interface element, which, upon being activated, presents additional related information. For example, by selecting the image element 154, highlights of the current game may be presented to the user, such as by streaming or other communication protocols. The PLAYERS interface element 158 can be activated to provide information about the top-rated players, such as player statistics, highlights for such players from the present and/or previous games, etc.

The interface 150 also can include user interface elements or links to other related websites and/or services. By way of example, the interface can include selectable buttons or links, generally indicated at 162, which include: a link to the service provides homepage (HOME); an interactive of list of new games and/or games for which new spectator services are available (WHAT'S NEW); an interactive list of games having the largest following, such as based on the size of audience and/or number of participants (WHAT'S HOT); and an interactive list for star participants of selected games (STAR PLAYERS). The interactive list of stars, for example, can provide links to Web pages that contain more detailed information about each star player, such as statistical information, biographical information, etc.

The illustrated interface 150 also includes a BUDDIES user interface element 164 that provides information indicative of other persons logged on as spectators that are linked or associated with the user of the interface, such as by identifying characteristics shared between two or more users (e.g., through an instant messaging service). The BUDDIES interface element 164, for example, is a button or link that accesses another Web page or service operative to provide additional information about the user's associates. Such information can include a representation of the associate (e.g., graphical and/or textual) as well as each associate's location, namely, an indication of which game(s) the associate is a spectator.

FIG. 5 illustrates an example of another graphical user interface 180 that provides information about a user's associates in accordance with an aspect of the present invention. The interface 180 can include selectable buttons or hypertext links 182, (e.g., HOME, WHAT'S NEW, WHAT'S HOT, and STAR PLAYERS), such as described above with respect to FIG. 4.

The interface 180 also can include user interface elements 184 for each associate that currently is a spectator of one or more games. By way of example, each user interface elements 184 includes a representation interface element 186 of the respective associate. The representation element 186 can include a graphical and/or textual representation of the associate as well as provide a link to the location(s) (e.g., URL(s)) where the associate is located. The interface elements 184 also include a location interface element 188 corresponding to the location of the user's associates. The location interface element 188 might identify which game the associate is a spectator of as well as provide a link to the spectator experience (and location therein) where that associate is located. Thus, by activating or selecting one of the interface elements 186, 188, a user may access the spectator experience in which the user's associate already is a spectator.

FIG. 6 illustrates a diagrammatic representation 200 of a spectator experience, such as could be provided by a spectator engine in accordance with an aspect of the present invention. In this example, the representation 200 includes one or more players 202 that interact with a game environment 204. It will be understood and appreciated by those skilled in the art that a spectator experience could be implemented for any type of game or event (e.g., action video games, adventure video games, board games, music and theatrical performances, sporting events, etc.) in accordance with an aspect of the present invention.

The representation 200 also includes an indication of spectators 206 of the game being played. The indication of spectators 206, for example, can be represented in a graphical, textually and/or audible manner, such as to provide audience awareness for all spectators. In one particular aspect, spectators can be arranged in groups so that associated spectators of a given game are more specifically identified with each other, such as through a messaging service. Accordingly, a group of friends can spectate a game as a group. A given spectator further can be associated with more than one group and communicate with others in the group. The messaging service further can enable communication (e.g., voice, text, and/or video) between the associated spectators. An indication of the spectator' presence also can be provided to the players of a given game, such as in the form of audio, text and/or a graphically created audience based on the spectator information.

Another aspect of the present invention provides a mechanism to provide other information that might be useful to spectators. For example, an advertisement (or link) 208 for one or more related games could be provided to the spectators. Those skilled in the art will understand and appreciate various presentation formats that could be utilized. For example, the advertisement can be in the form of a HTML or DHTML DIV that provides a message about the item for sale together with selectable buttons to buy the offered item or cancel the advertisement. Such functionality can be controlled by individual spectators and/or by the service that provides the spectator experience.

Figure 7:
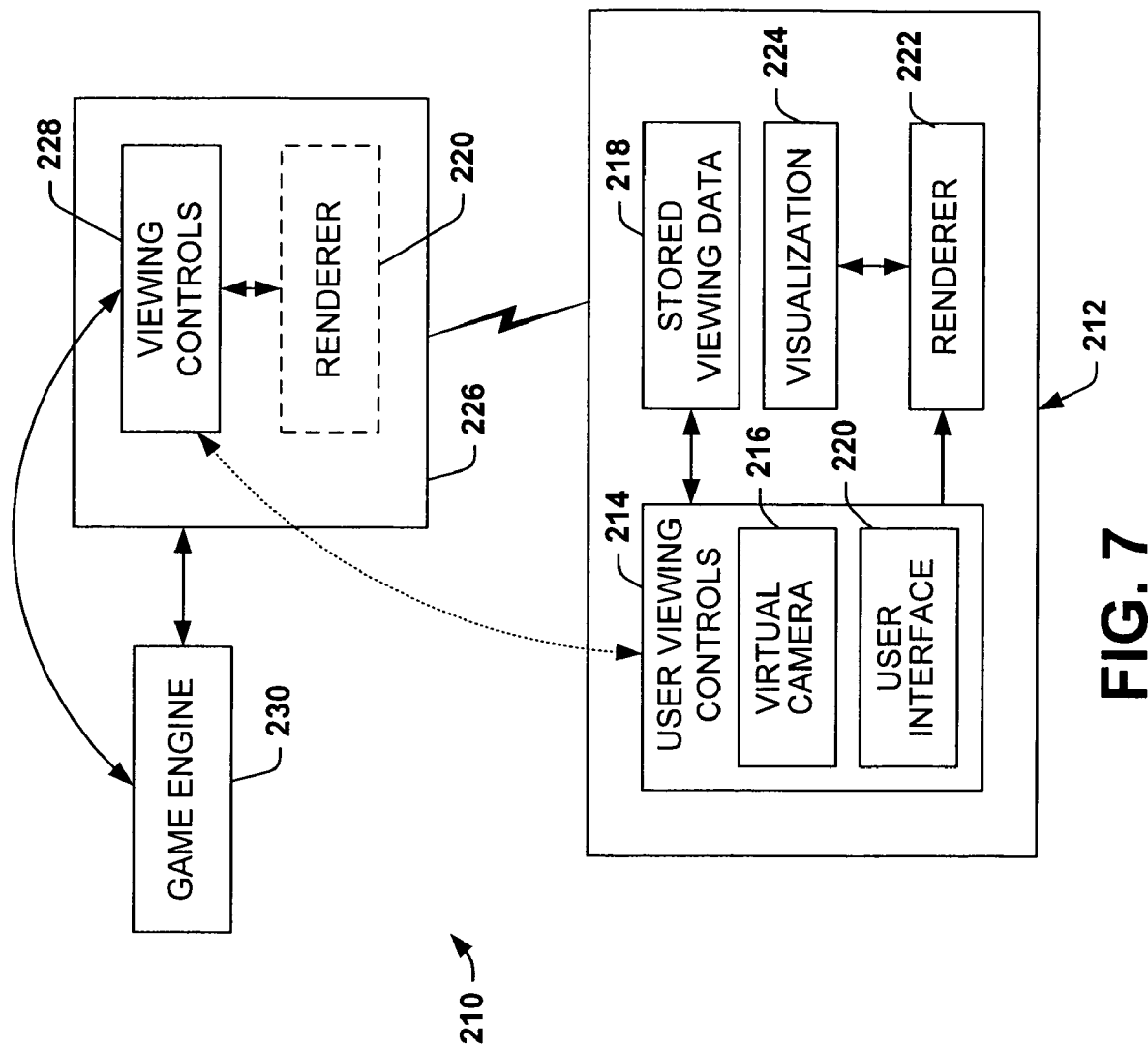
FIG. 7 is a functional block diagram illustrating an example of viewing controls associated with a spectator system in accordance with an aspect of the present invention.

FIG. 7 illustrates an example of a functional block diagram of a system 210 operative to implement viewing controls for a spectator experience in accordance with an aspect of the present invention. The system 210 includes an interactive user process 212, which can run locally at a user device (e.g., a PC, a game console, a handheld device, etc.) and/or at another machine, such as in a distributed computing environment. The user process 212 is programmed to control the representation of the game or event being provided at the user.

By way of example, the user process 212 includes viewing controls 214, which control the representation of graphical features displayed to the spectator. In accordance with an aspect of the present invention, the viewing controls 214 can be programmed to select viewing angles for a virtual camera 216 associated with the spectator experience of the game. For example, the viewing control 214 can access stored viewing data 218, which includes graphical and/or logical elements associated with the game. The virtual camera 216 thus can aggregate the stored graphical (and/or audio) viewing data 218 and the spectator data to provide a corresponding representation as part of the spectator experience. The user process 212 also includes a user interface 220 operative to select one or more camera control methodologies to implement a desired viewing angle, to follow actions of one or more players, and/or otherwise customize the user's spectator experience. Alternatively or additionally, the viewing controls 214 can create a spectator experience based on historical viewing selections of a user and/or based on preselected viewing preferences.

The viewing controls 214 also can be coupled to a renderer 222 that renders a corresponding animated graphical visualization 224 for the associated spectator experience based on processed spectator data provided by the viewing controls. The renderer 222 can be implemented as part of the user process 212 and/or as part of a service implemented in conjunction with the spectator engine 226, such as illustrated in phantom.

The spectator engine 226 also can implement a central viewing control component 228. The central viewing control component 228, for example, can determine what spectator data should be routed to each user process 212, such as by filtering extraneous information from the aggregated game data collected from an associated game engine 230 or adding other enhancements thereto. In one aspect, the viewing controls 214 and 228 might cooperate to affect different granular levels of the spectator experience, such that the central viewing control implements basic, high level controls with user viewing controls 214 implementing user specific, customized spectator features.

By way of illustration, the spectator experience can be programmed to implement automatic as well as manual (e.g., user-selected) virtual camera control. When operating in an automatic mode, the central viewing controls 228 operate in conjunction with various components of the spectator engine 226 to provide a selected subset of the aggregated data to the user process 212. The selected subset of data, for example, includes information about the current occurrence of the game (e.g., participant interaction, description of events, etc.) and state information. The viewing controls 228, in turn, determine virtual camera placement for the selected data based on a defined rule set, which can be based on cinematographic heuristics for selecting good viewpoints and/or idioms for capturing the interesting circumstances or events associated with a game. The camera specification data is provided to the renderer 220. The renderer 220 generates a visual representation of the game using animation parameters and a description of the current game environment, such as provided by the game engine 230 as well as based on the camera specification derived by the viewing controls 228.

It is to be appreciated that the particular implementation of the renderer(s) 220 and viewing controls 214, 228 generally will vary according to the architecture in which the system 210 is implemented.

FIGS. 8-12 illustrate examples of architectures that can be utilized to implement a spectator experience in accordance with an aspect of the present invention. It will be understood and appreciated that a spectator experience is not limited to being implemented according to the illustrated architectures, as other suitable arrangements exist.

Figure 8:
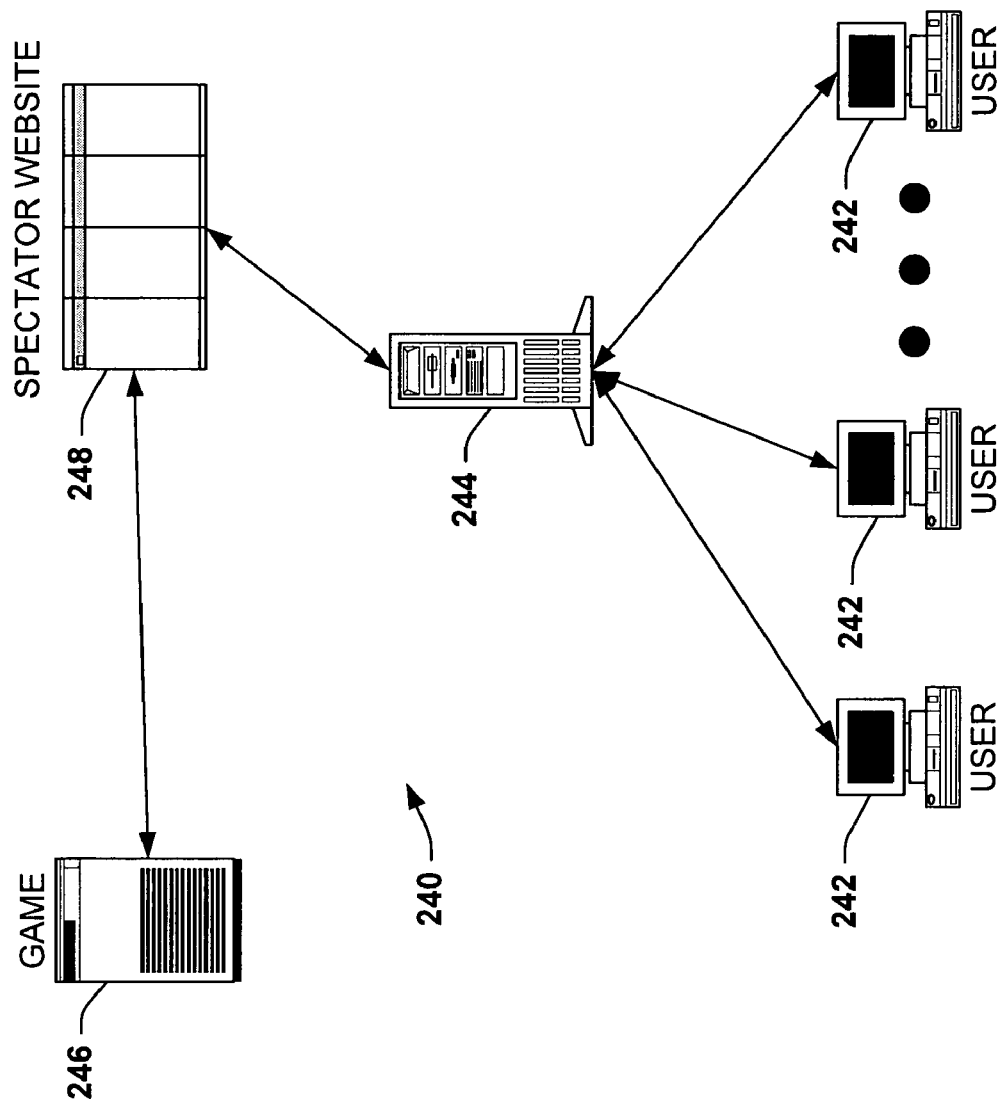
FIG. 8 is an example of a system architecture that can be programmed to implement a spectator system in accordance with an aspect of the present invention.

FIG. 8 shows a basic architecture 240 in which a spectator system can be implemented as part of a client-server model in accordance with an aspect of the present invention. The architecture 240 includes a plurality of users 242 that communicate with a server 244, such as via associated communications links. The users 242, for example, include the graphical and logical elements for an associated game (or games) to facilitate generation of the spectator experience. The executable instructions that include the logical and graphical elements of the game, such as include the game engines or a spectator version thereof, could be provided to the users via CD (e.g., a spectator CD or game CD), or be downloaded via the Internet and stored at the users 242.

The server 244, for example, is operatively coupled to a game server 246 for receiving game data that varies over time. The game server 246, for example, could provide a file or stream data corresponding to a replay of previously played game, which information identifies state changes of the game over time. The server 244 processes the game and enhances the data to include spectator features in accordance with an aspect of the present invention. The server 244 then distributes the enhanced spectator data to the users 242, which generate corresponding spectator experiences. The server 244 further can enable interactive communication between the users 242 during a shared spectator experience, such as in conjunction with an associated messaging service.

The servers 244 and 246 also can be operatively coupled to a spectator Website 248, which can be hosted by one of the servers 244, 246 or one or more other machines. The Website 248, for example, provides a portal through which the users 242 can access the spectator experience for an occurrence of a game at the server 246. The Website 248 could also provide spectator information about other games. For example, the server 244 can provide the Website 248 with statistical information about the participants of the game, information about the pool of spectators of one or more games, as well as other game-related information.

Figure 9:
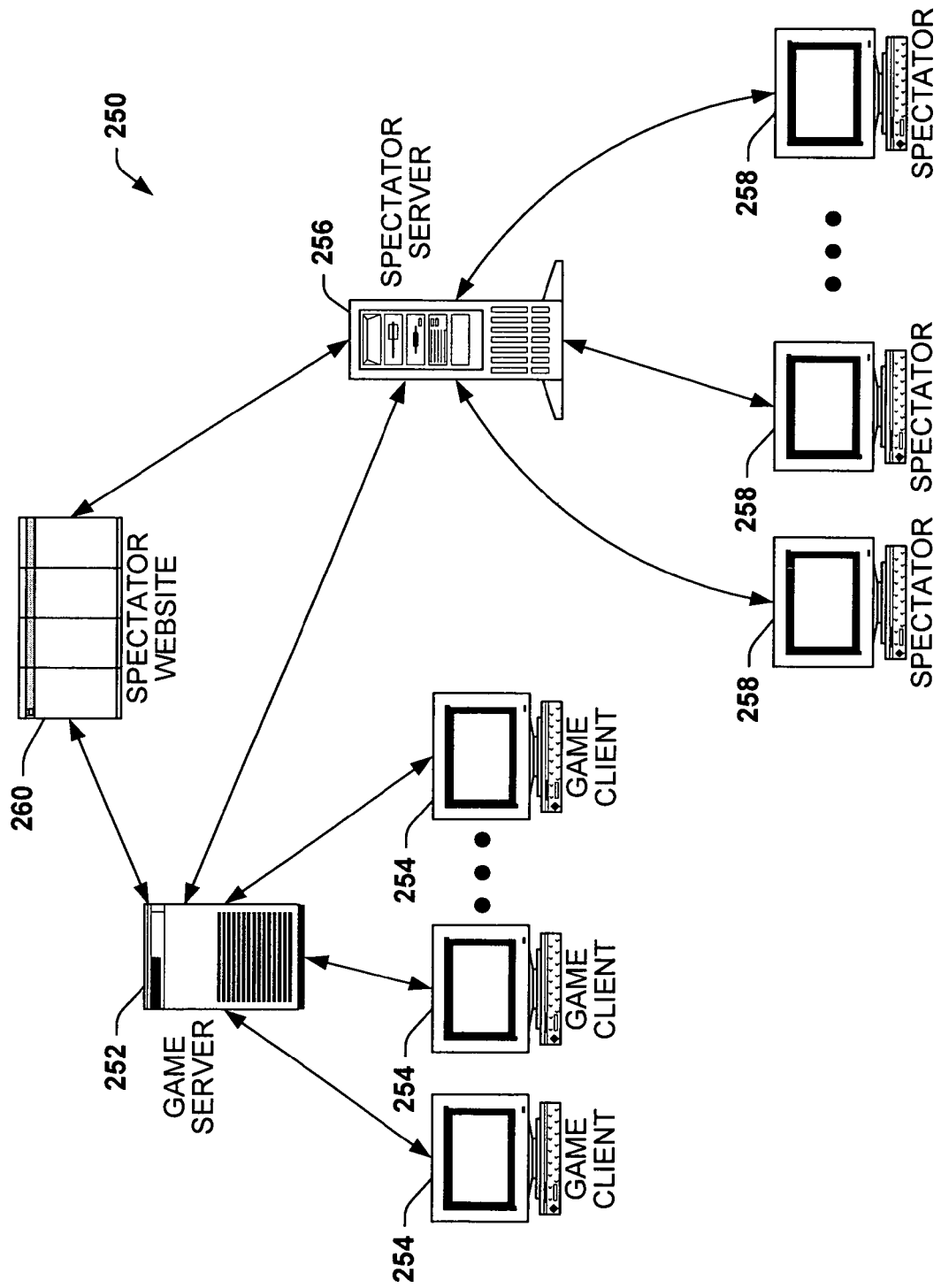
FIG. 9 is another example of a system architecture that can be programmed to implement a spectator system in accordance with an aspect of the present invention.

FIG. 9 illustrates another architecture 250 that can be utilized to implement a spectator experience in accordance with an aspect of the present invention. The architecture 250 includes a game server 252 to which one or more game clients 254 are operatively coupled to participate in an occurrence of a game. Game and movement information, including state information and object geometry information, is communicated between the game server 252 and each of the game clients 254. As a result, each of the clients 254 is able to generate a unique multiplayer game experience based on their interactions with and information provided from the game server 252.

The game server 252 is coupled to a spectator server 256 to provide an indication of the game and movement information. The game server 252, for example, provides live (or delayed) game data to the server 256, such as in response to interactions from one or more participants 254 of the game. The spectator server 256 distributes to spectators 258 corresponding spectator data for the game based on the game data provided from the game server 252. The spectator data can include the game and movement information (or at least selected portions thereof) received from the game server 252. The spectator data also can include other spectator data, such as statistical information about the game and/or its participants, highlight footage from a current or previous games, information about the spectators of the current game, etc. The spectators 258, for example, are programmed with graphical and logical elements for the game, so that a representation of an associated spectator experience can be generated based on the spectator data from the server 256. Accordingly, the representation of the spectator experience can be rendered locally at each spectator 258. The spectators 258 further can control different aspects of the spectator experience, such as selecting parameters to define camera angle and viewpoints.

The servers 252 and 256 also can be coupled to a spectator Website 260 that collects spectator data and game data. One of the servers 252, 256 can host the Website 260, or it can be hosted by one or more other computers. By way of illustration, the Website 260 provides a portal through which the users can obtain information about a spectator experience for one or more games. For example, the server 252 can provide the Website 260 statistical information about the participants of the game, information about the pool of spectators 258 of one or more games, as well as other game-related information. Such information can be utilized to provide enhanced features for a spectator experience, such as described herein.

Figure 10:
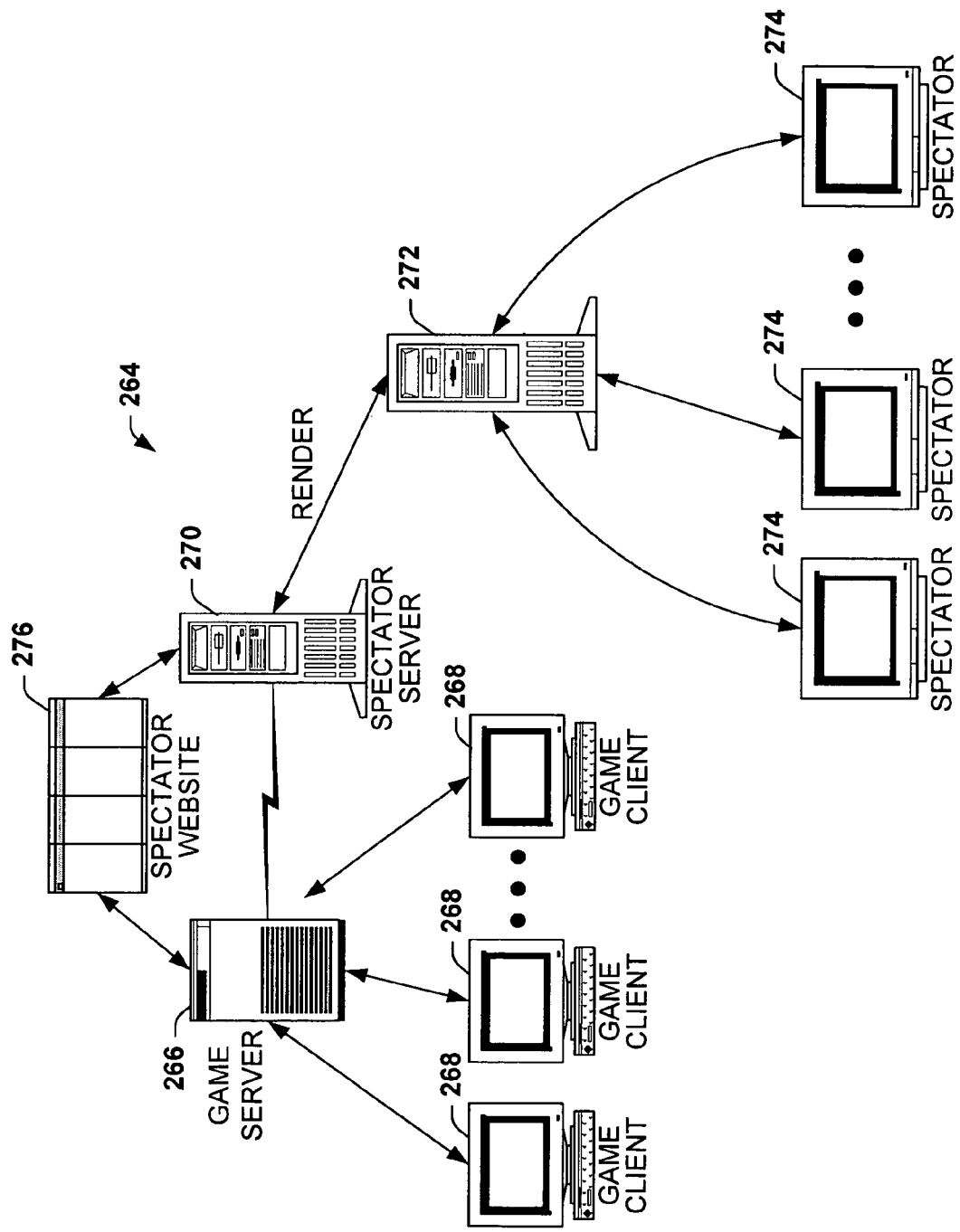
FIG. 10 is another example of a system architecture that can be programmed to implement a spectator system in accordance with an aspect of the present invention.

FIG. 10 illustrates another architecture 264 that can be utilized to provide a spectator experience in accordance with an aspect of the present invention. The architecture 264 includes a game server 266 that provides a multiplayer game to which one or more participants or game clients 268 can connect to play an occurrence of the associated game. Accordingly, game and movement information are communicated between each of the game clients 268 and the game server 266 during the occurrence of the game.

A spectator server 270 is operatively coupled to the game server 266, such as through an associated communication link. The spectator server 270 receives state and object geometry information from the game server 266 based on which the spectator server can generate a spectator experience that includes some or all of the participants at the game clients 268. The spectator sever 270, for example, includes the logical and graphical elements for the game as well as viewing controls for implementing cinematographic functionality that determines the virtual camera position and viewing angle. The spectator server 270 further can remove obstructions, enhance graphics or perform other actions to make a resulting spectator experience more visually pleasing. The spectator server 270 can render a scene of the game based on the viewing control data and animation parameters associated with the current description of the game. The rendered data is provided to a distribution system 272. The distribution system 272, for example, includes an encoder operative to distribute (e.g., stream) the rendered spectator experience to one or more spectators 274 of the game. In this particular example, it is not necessary that the graphical and logical elements of the game be stored at the spectators 274, as the spectator experience is rendered (at least in part) prior to being distributed by the distribution system 272.

The architecture 264 includes a spectator Website 276, such as hosted by one or more servers, with which the game server 266 and spectator server 270 can communicate. The Website 276, for example, collects information about the occurrence of the game at the game server 266, such as player information or other events that transpire within the game. The Website 276 also can collect and post information about spectators 274, such as information about the number of spectators as well as contain an indication of their identity, such as could be implemented in conjunction with a messaging system. Highlights and sample spectator scenes also can be available at the Website 276. The spectator server 270 and/or the game server 266 can utilize the aggregated information to further augment the spectator experience and/or the game itself, respectively.

Figure 11:
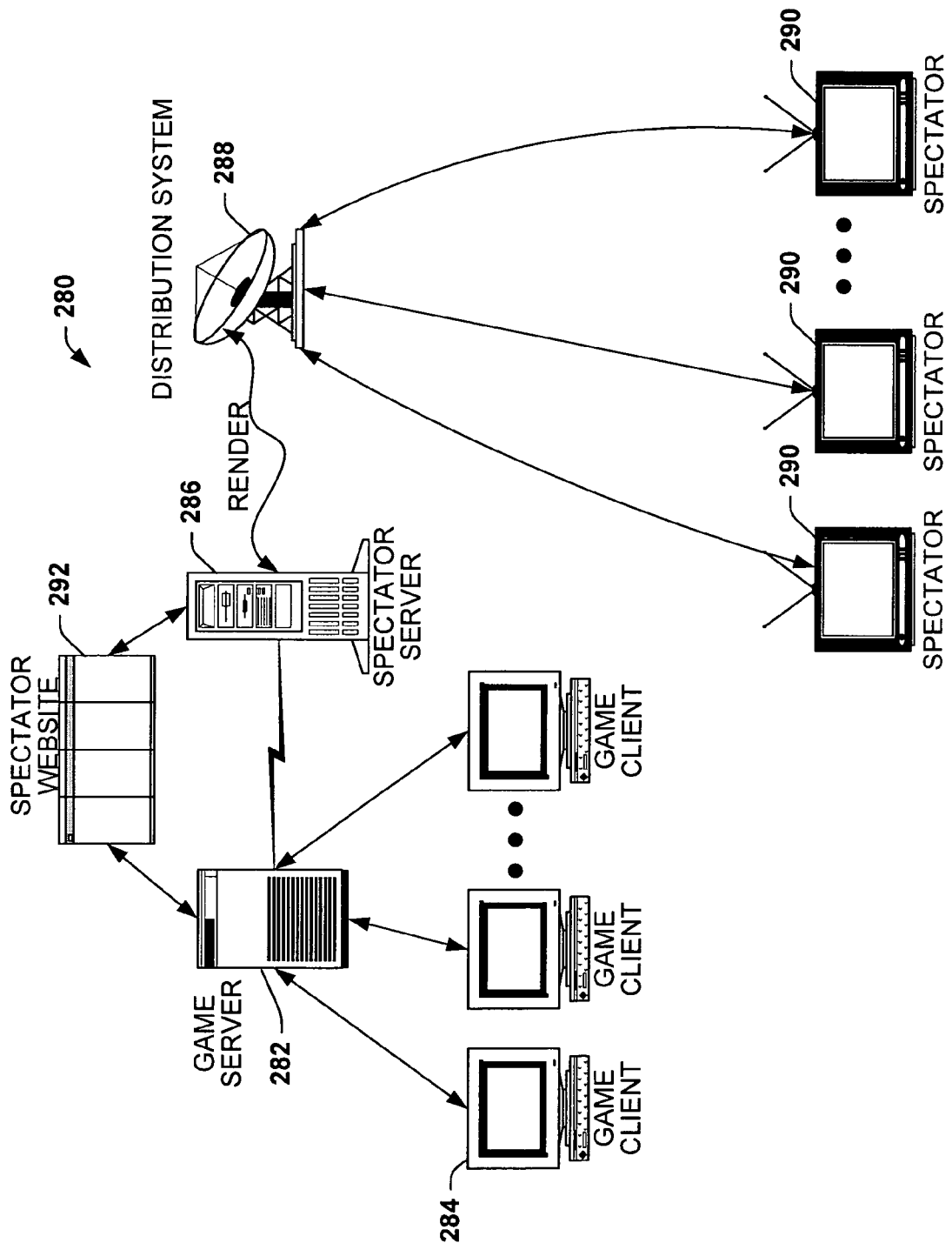
FIG. 11 is another example of a system architecture that can be programmed to implement a spectator system in accordance with an aspect of the present invention.

FIG. 11 illustrates another example of an architecture 280 that can be utilized to implement a spectator experience in accordance with an aspect of the present invention. The architecture 280 is similar to the architecture 264 of FIG. 10, except for the manner in which the spectator experience is distributed and received.

Briefly stated, the architecture 280 includes a game server 282 to which one or more participants or game clients 284 are connected to communicate game and movement information therebetween. This creates a game that varies over time according to the interaction of the participants at the clients 284.

A spectator server 286 is operatively coupled to the game server 282 such as to receive state and object geometry information from the game server, similar to the game clients. The spectator server 286 is programmed to implement cinematographic methods or functions to determine the graphical and functional features that are to be provided as part of a spectator experience. An animated representation of the spectator experience is rendered based on selected game and animation parameters associated with the current game.

The rendered data is provided to a distribution system 288 to distribute (e.g., broadcast) a representation of the rendered spectator experience to one or more spectators 290 of the game. In the example of FIG. 11, the distribution system 288 is a broadcast system operative to broadcast the spectator experience over one or more associated media. For example, the broadcast can be a satellite transmission, broadband cable, digital cable, cellular transmission, etc. The spectators 290, which may include televisions or other entertainment appliances, are configured to receive and decode the broadcast data and provide a corresponding visual and/or audio representation of the spectator experience. The communication between the spectators and the broadcast system can be bidirectional with communication over one or more media so that spectator information can be provided back to the spectator server 286.

The architecture 280 also can include a spectator Website 292 that communicates with the game server 282 and spectator server 286. The Website 292, for example, collects information about the occurrence of the game at the game server 282, such as player information or other significant events associated with the game. The Website 292 also can collect and post information about spectators, such as information received at the spectator server 286 from the spectators 290, including an indication of the number of spectators, an indication of their identity, and/or commentary from the spectators. Highlights and sample spectator scenes also can be available at the Website 292. The spectator server 286 and/or the game server 282 can utilize information aggregated at the Website 292 to augment the spectator experience and/or the game itself, respectively. Alternatively or additionally, such information can be communicated between the servers 282 and 286.

Figure 12:
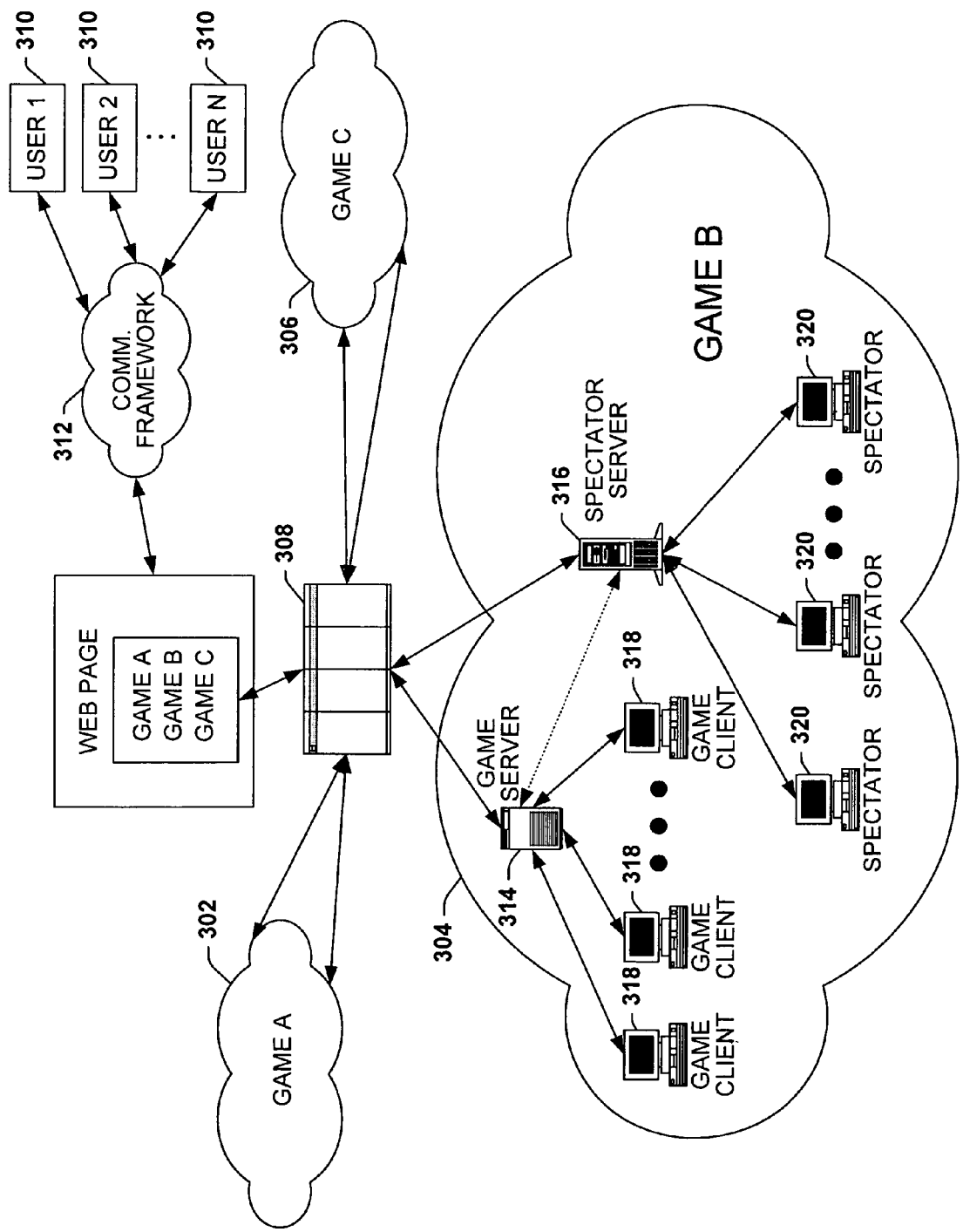
FIG. 12 is an example of a system architecture that can be programmed to implement a spectator system in accordance with an aspect of the present invention.

FIG. 12 illustrates an example of a multi-game spectator system 300 implemented in accordance with an aspect of the present invention. The system 300 includes three games 302, 304, and 306, although it is to be appreciated that any number of one or more games could be implemented in the system. Each of the games 302, 304, 306 includes one or more participants. Each game is associated with a Website 308, such as may be hosted by one or more servers. The Website 308 is programmed and/or configured to present information about each of the games 302, 304, and 306. Accordingly, the games 302, 304, and 306 feed information to the Website 308. The information, for example, includes statistical information (e.g., number of players, number of participants, performance rating, rankings of players, etc.), highlights from current and/or recent games, interactive spectator activities, and/or links to connect users of the Website to game servers and/or spectator servers for each game 302, 304, 306.

One or more users 310 can access the Website 308 through a communications framework 312, such as the Internet. Accordingly, the users 310 can obtain information about one or more of the games 302, 304, and 306. In addition, the users 310 can utilize the Website 308 to connect to a game or spectator experience associated with one or more of the games 302, 304, and 306. By way of illustration, the Website 308 provides a portal by which users can become spectators or participants of the games 302,304, and 306. A user 310 thus can connect to the Website 308 and, by selecting an appropriate link, be redirected to a location (e.g., a URL associated with a server) at which the game or spectator experience exists. That is, the Website 308 facilitates connecting users 310 with servers hosting a game or spectator experience.

For sake of brevity, an example of a subsystem architecture is illustrated for the game 304. It is to be understood and appreciated that similar architectures, which can differ from that of the game 304, are implemented in connection with the other games 302 and 306 in accordance with an aspect of the present invention.

The game 304 includes a game server 314 and a spectator server 316. The game server 310 is operatively coupled to one or more game clients 318. The game clients 318, for example, can include PCs, game consoles, workstations, handheld devices, and other entertainment appliances. The game clients 318 interact with the game server 314 through physical and/or wireless connections, such as by communicating game and movement information. Such interactions define the state and object geometry for the occurrence of the game.

The game server 314 also communicates information to and/or from the Website 308. For example, the game server 314 can provide game and movement information associated with an occurrence of the game from which a spectator module associated with the Website 308 can generate a representation of the data (e.g., highlights, examples of recent play, etc.). The Website 308 also can provide feedback to the game server 314, such as including an indication of the spectator audience. For example, the game server 314 can employ the feedback to create an indication of a spectator presence that can communicate to each game client 318. The spectator presence can take any form within the game, such as can include audio and/or graphical features implemented as part of the multiplayer game.

One or more spectators 320 can be connected to the spectator server 316. Game and movement data can be communicated from the game server 314 to the spectator server 316, based on which the spectator server can generate a spectator experience that is provided to the spectators 320 in accordance with an aspect of the present invention. The spectator server 316 also can collect information from the spectators 320, such as to discern the number of spectators as well as an indication of their identity. Spectators 320 also can provide commentary and/or other spectator feedback to the spectator server 316. The spectator server 316, in turn, can pass such information to the Website 308 and/or to the game server 314. Such information can include an indication of the number of spectators 320, an indication of the identity of the spectators, as well as other information about the interaction between spectators and the spectator experience being provided by the server 316. The spectators 320 also could provide instructions to the spectator server 316 to control graphical and/or audio that form the spectator experience. For example, the spectators 320 can be programmed and/or configured to implement viewing controls to selectively control what aspects of the game and the level of zoom are used to create a representation of a spectator experience. It is to be appreciated that the viewing controls can be implemented locally at each spectator 320 and/or remotely at the spectator server 316.

The spectator server 316 also can communicate with the game server 314, such as by providing the game server 314 information about the spectators and the spectator experience. The game server 314, for example, can employ such information to implement spectator effects within the occurrence of the game (or games) at the game server. As a result, the participants of the game at the game clients 318 can perceive the presence of the spectator audience.

Figure 13:
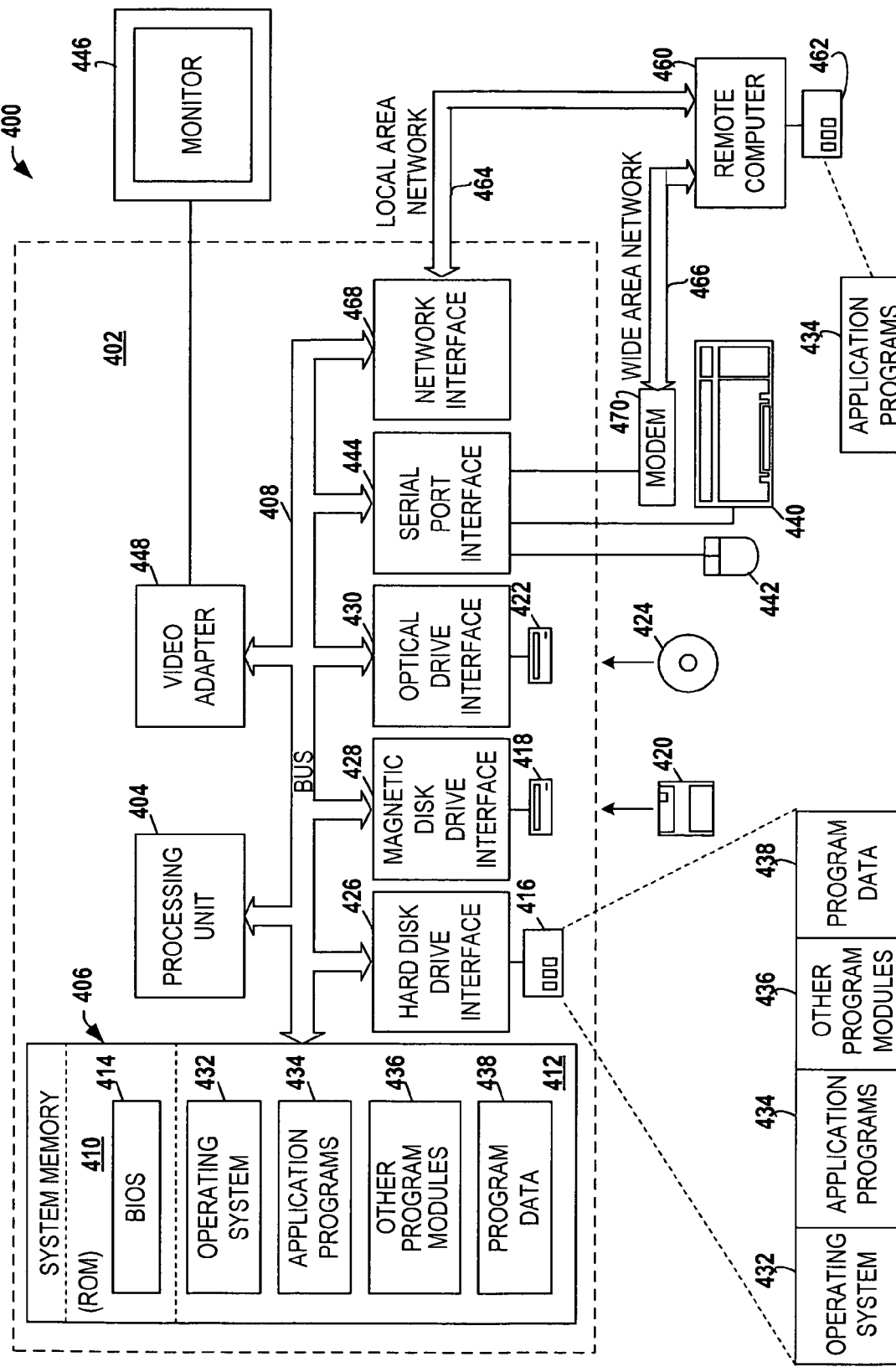
FIG. 13 is an example of an operating environment in which a spectator system in accordance with an aspect of the present invention could be implemented.

In order to provide additional context for various aspects of the present invention, FIG. 13 and the following discussion are intended to provide a brief, general description of one possible suitable environment 400 in which the various aspects of the present invention may be implemented. It is to be appreciated that the computing environment 400 is but one possible computing environment and is not intended to limit the environments with which the present invention can be employed. Those skilled in the art will appreciate that the inventive methods may be practiced with other system configurations, including single-processor or multiprocessor computer systems, minicomputers, mainframe computers, as well as personal computers, hand-held computing devices, microprocessor-based or programmable consumer electronics, video game consoles, and the like.

The illustrated aspects of the invention may also be practiced in distributed computing environments where certain tasks are performed by remote processing devices that are linked through a communications network. In a distributed computing environment, program modules may be located in both local and remote memory storage devices.

While various aspects of the present invention have been described above in the general context of computer-executable instructions that may run on one or more computers or other microprocessor-based equipment, it is to be recognized that the invention also may be implemented in combination with other program modules and/or as a combination of hardware and software. Generally, program modules include routines, programs, components, data structures, etc. that perform particular tasks or implement particular abstract data types.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, the exemplary environment 400 for implementing various aspects of the invention includes a computer 402, including a processing unit 404, a system memory 406, and a system bus 408 that couples various system components including the system memory to the processing unit 404. The processing unit 404 may be any of various commercially available processors. Dual microprocessors and other multi-processor architectures also can be used as the processing unit 404. The computer 402 and/or portions thereof may be implemented as any electronic appliance operable to communicate with a Web-based service, such as, for example, a telephone (wired or wireless), a personal computer (PC) (e.g., handheld, desktop, portable, etc.), a roaming PC, a PDA, game console or entertainment appliance, or any other suitable microprocessor-based appliance.

The system bus 408 may be any of several types of bus structure including a memory bus or memory controller, a peripheral bus, and a local bus using any of a variety of commercially available bus architectures. The system memory 406 includes read only memory (ROM) 410 and random access memory (RAM) 412. A basic input/output system (BIOS) 414, containing the basic routines that help to transfer information between elements within the computer 402, such as during start-up, is stored in ROM 412.

The computer 402 may further include a hard disk drive 416, a magnetic disk drive 418, e.g., to read from or write to a removable disk 420, and an optical disk drive 422, e.g., for reading and/or writing data relative to 424 optical media. The hard disk drive 416, magnetic disk drive 418, and optical disk drive 422 are connected to the system bus 408 by a hard disk drive interface 426, a magnetic disk drive interface 428, and an optical drive interface 430, respectively.

The computer 402 typically includes at least some form of computer readable media. Computer readable media can be any available media that can be accessed by the computer 402. By way of example, computer readable media may comprise computer storage media and communication media. Computer storage media may include volatile and nonvolatile, removable and non-removable media implemented in any method or technology for storage of information such as computer readable instructions, data structures, program modules, or other data. Computer storage media may include RAM, ROM, EEPROM, flash memory or other memory technology, CD-ROM, digital versatile disks (DVD), or other magnetic storage devices, or any other medium which can be used to store the desired information and which can be accessed by the computer 402. Communication media typically embodies computer readable instructions, data structures, program modules or other data in a modulated data signal such as a carrier wave or other transport mechanism and includes any information delivery media. A modulated data signal includes a signal that has one or more of its characteristics set or changed in such a manner as to encode information provided in the signal. By way of example, communication media may include wired media such as a wired network or direct-wired connection, and wireless media such as acoustic, RF, optical and other wireless media. Combinations of any of the above should also be included within the scope of computer readable media.

A number of program modules may be stored in the drives and RAM 412, including an operating system 432, one or more application programs 434, other program modules 436, and program non-interrupt data 438. The operating system 432 in the illustrated computer can be any of a number of commercially available or proprietary operating systems.

A user may enter commands and information into the computer 402 through a keyboard 440 and a pointing device, such as a mouse 442. Other input devices (not shown) may include a microphone, an IR remote control, a joystick, a game pad, a satellite dish, a scanner, or the like. These and other input devices are often connected to the processing unit 404 through a serial port interface 444 that is coupled to the system bus 408, but may be connected by other interfaces, such as a parallel port, a game port, a Universal Serial Bus ("USB"), an IR interface, etc. A monitor 446, or other type of display device, is also connected to the system bus 408 via an interface, such as a video adapter 448. In addition to the monitor, a computer typically includes other peripheral output devices (not shown), such as speakers, printers etc.

The computer 402 may operate in a networked environment using logical connections to one or more remote computers, such as a remote computer(s) 460. The remote computer(s) 460 may be a workstation, a server computer, a router, a personal computer, a microprocessor based entertainment appliance, a peer device, or other common network node. The remote computer may include many or all of the elements described relative to the computer 402, although, for purposes of brevity, only a memory 462 is illustrated. The logical connections depicted include a local area network (LAN) 464 and a wide area network (WAN) 466, such as the Internet. Such networking environments are commonplace in offices, enterprise-wide computer networks, intranets, and the Internet.

When used in a LAN networking environment, the computer 402 is connected to the local network 464 through a network interface or adapter 468. When used in a WAN networking environment, the computer 402 typically includes a modem 470, or is connected to a communications server on the LAN, or has other means for establishing communications over the WAN 466. The modem 470, which may be internal or external relative to the computer 402, is connected to the system bus 408 via the serial port interface 444. In a networked environment, program modules 436, application programs, or portions thereof, may be stored in the remote memory storage device 462. Similarly, when the computer 402 stores target data, such data may be stored in memory 426, 428, 430 of the computer or remote memory 462. It will be appreciated that the network connections shown are exemplary and other means of establishing a communications link between the computers can be used.

Figure 14:
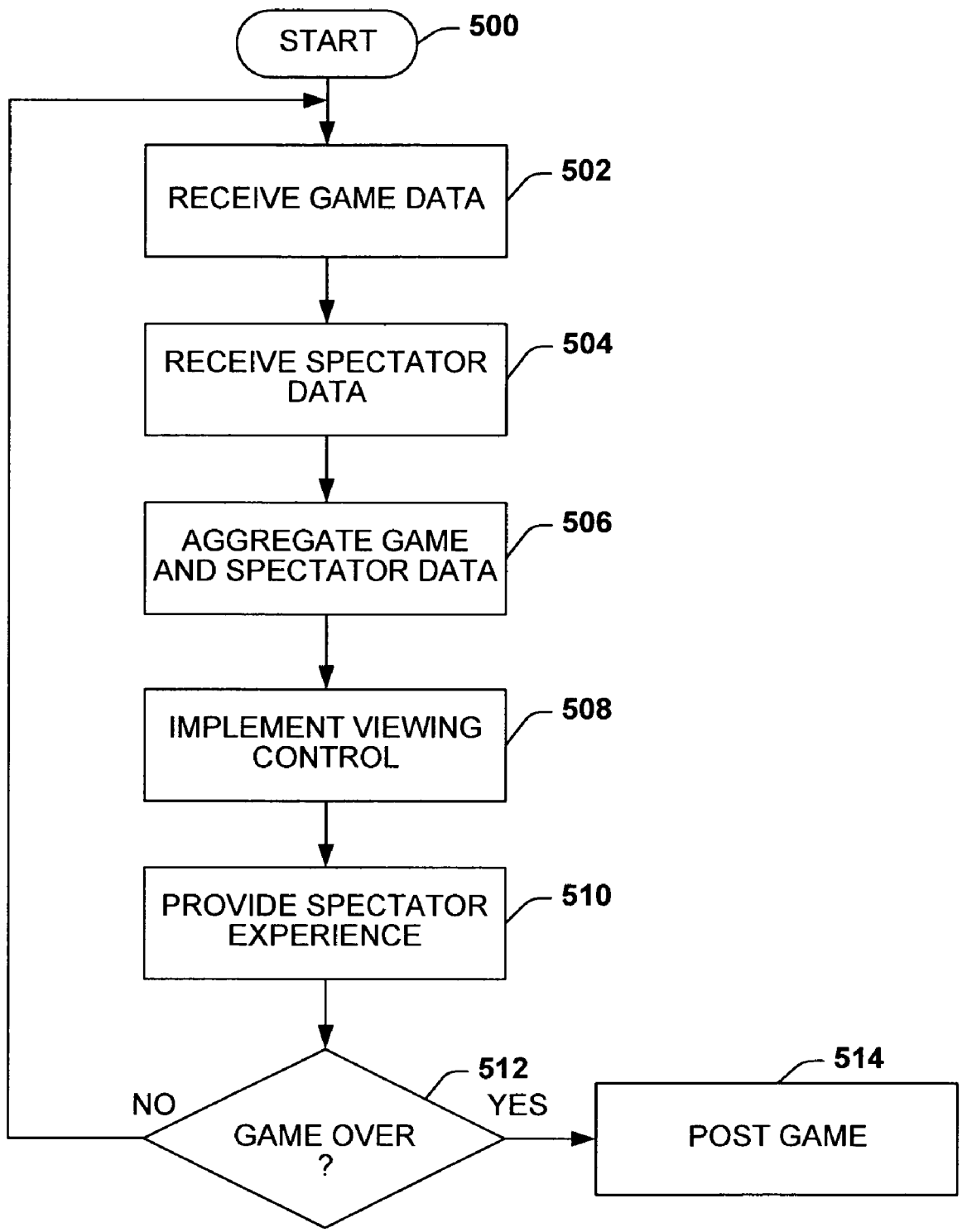
FIG. 14 is a flow diagram illustrating a methodology for providing a spectator experience in accordance with an aspect of the present invention.
Figure 15:
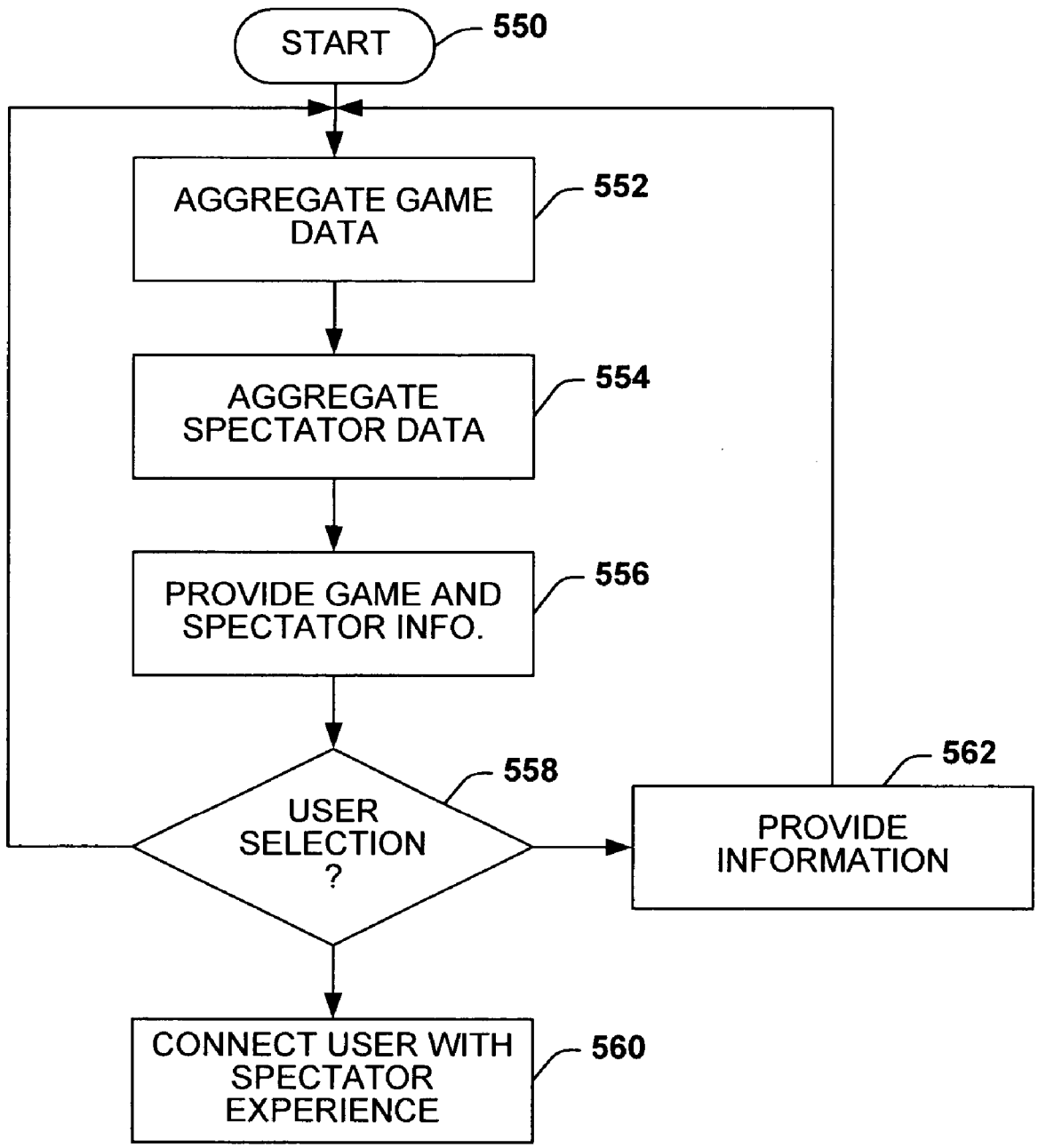
FIG. 15 is a flow diagram illustrating a methodology for providing portal to one or more spectator experiences in accordance with an aspect of the present invention.

In view of the exemplary systems shown and described above, methodologies, which may be implemented in accordance with the present invention, will be better appreciated with reference to the flow charts of FIGS. 14 and 15. While, for purposes of simplicity of explanation, the methodologies are shown and described as implementing serially, it is to be understood and appreciated that the present invention is not limited by the illustrated order, as some features can, in accordance with the present invention, occur in different orders and/or concurrently with other features shown and described herein. Moreover, not all illustrated aspects may be required to implement a methodology in accordance with the present invention. In addition, the methodologies of FIGS. 14 and 15 may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

FIG. 14 illustrates an example of a methodology for providing a spectator experience in accordance with an aspect of the present invention. At 500, general initializations occur, such as in connection with activation of a game or event. Such initializations might include allocating memory, establishing pointers, establishing data communications, acquiring resources, instantiating objects and setting initial values for variables.

At 502, game data is received. The game data, for example, can include state information and object geometry information, which can vary in response to player interaction during the occurrence of the game. The state and object geometry information, for example, are sufficient to generate an audio and/or visual representation of the occurrence of the game in conjunction with stored graphical and functional features corresponding to the game.

At 504 spectator data also is received, such as from users of the spectator experience, a game server, or another service that collects such information. The spectator data, for example, can provide an indication of the number and/or identity of spectators operatively associated with the occurrence of a game or event. The spectator data also could provide spectator preference information. The spectator preference information can be utilized to implement desired camera control, such as to focus the spectator experience on activities of one or more selected players of the game. The spectator preferences also can be used to control other spectator effects to be implemented in connection with the spectator experience.

At 506 the game data is aggregated with spectator control data. The aggregation could include a correlation of the game data, such as filtering out of extraneous game data in view of the spectator data. In addition or alternatively, the aggregation can place the aggregated data into a specified format to facilitate processing thereof.

At 508, viewing control is implemented. The viewing control can include manual and/or automatic control of one or more virtual cameras operative to configure the spectator experience. Manual control could be implemented by one or more persons selectively editing portions of the game into the spectator experience. Automatic camera controls, for example, select viewing angles by employing virtual cameras arranged throughout the environment that operate according to cinematographic heuristics implemented as cinematographic virtual camera control algorithm. Some of the camera control information also can be selected by the spectators, such as being associated with a given player or players and/or a selected level of resolution.

The viewing control, for example, can be used to select which graphical and and/or audio data are to comprise the spectator experience. The graphical features can include the viewing angle and/or applicable zoom to be applied relative to each scene. In addition, viewing control can implement other spectator features, such as an indication of the spectator audience by adding graphical and/or audio elements in combination with the associated game data and spectator data. The viewing control further can employ the spectator data to augment or modify various graphical and/or audio elements of the game as a function of the spectator interactions. Such elements can further be implemented for one or more different groups of associated spectators to provide customized spectator experiences. Moreover, a spectator could be part of one or more of such spectator groups.

At 510, the spectator experience is provided based on viewing control applied to the aggregated game and spectator data. The spectator experience can include any number of representations, each of which can be provided by any data communications means, such as streaming over a network, broadcast over satellite, cable or other communication frameworks. In addition, some of the graphical and audio elements can be stored locally at the spectator site, such as to facilitate local generation of the representation of the spectator experience. The amount of data stored locally will tend to vary depending on the architecture in which the spectator system is being implemented. Other considerations include the available bandwidth and the performance characteristics of the machine receiving the spectator experience information. For example, a television or Internet appliance may store little (if any) data while a PC or game console can store a much greater amount of game data, such as graphical and logical elements of the game.

At 512, a determination is made as to whether the occurrence of the game has ended. If the occurrence of the game continues, the methodology returns to 502 in which the preceding functionality is repeated for updated game and spectator data. Alternatively, if the game has ended, the methodology proceeds to 514 in which post game features can be implemented. The post game features can include highlights and commentary for the game, spectator interactive functionality, preparations for a subsequent game, etc. The particular post game features can vary depending on the architecture in which the spectator experience is implemented as well as the particular application of the game being implemented.

FIG. 15 illustrates an example of a methodology for implementing a portal associated with one or more spectator experiences in accordance with an aspect of the present invention. The methodology begins at 550 in which general initializations occur, such as in connection with activating a service programmed and/or configured to provide the portal. For example, the portal can be a Website hosted by a server that receives information relating to a plurality of games and spectator experiences and posts a representation of such information for access by users of the site. At 552, game data is received (or collected) and aggregated for one or more games. The game data, for example, can be received from one or more corresponding game servers or other computers operative to gather information about the occurrence of such games. The game data can include state information and object geometry information based on which an indication of the status of each participant and the game environment can be determined. In addition, the game data can provide an indication as to the identity of the participants.

At 554, spectator data also is received or collected for the spectators associated with each of the games. The spectator data is aggregated, for example, to derive an indication as to the number spectators associated with each of the game. The spectator data also can include an indication of the identity of certain spectators, such as based on one or more public keys operative to associate holders of the keys through a messaging service. Commentary from one or more spectators also can form part of the spectator data.

At 556, the aggregated game and spectator information is provided at the portal for each game for which the spectator and/or game data has been acquired. The aggregated game and spectator information is combined to provide information about the occurrence of each game as well as information about the audience of each game. The information, for example, includes graphics, text, and/or audio that are presented to users of portal. For example, information about the identity of players of each game can be made available to some users of the portal. That is, certain users can see if their favorite players are participants of a game. In addition, the identity of certain users can be made available to other users with which they have been previously associated, such as through a messaging service. In this way, a user can determine if and at which game their favorite players are participating as well as at which games their friends are spectating. Accordingly, users of the portal can determine which, if any, game or games the user would like to become spectators, such as based on who is participating in the game and/or the spectator audience. Highlights and replays of fascinating parts of games can also be made available at the portal. The information provided for each game further can include one or more user interface elements. A user interface element, for example, can provide a selectable link (e.g., HTML or DHTML executable instructions), operative to redirect or connect a user with a corresponding spectator server.

At 558, a determination is made as to whether a user selection has been made. If a user has selected a link to a spectator experience, the methodology proceeds to 560. At 560, for example, the user is redirected to the selected spectator experience, such as by providing the user's browser appropriate location information (e.g., the URL) for the experience. As a result, the user can connect to the spectator experience and, in turn, become part of the spectator audience of the associated game. A user also can return to the portal and, in turn, select to connect to other spectator experiences or implementing other functionality shown and described herein.

If the user selects additional information at 558, the methodology proceeds to 562. At 562, information corresponding to the selected interface element is provided to the user, such as associated with another page of the Website, a pop-up window, or by refreshing the current page. The portal also can provide links to enable spectators to become participants of the games.

If no user selection is made at 558 or after the information is provided at 562, the methodology returns to 552 in which 552-558 can repeat with updated game and spectator data. Such information can be continually aggregated and presented at the portal.

In view of the foregoing, it is to be appreciated that the present invention provides an enhanced spectator experience. The spectator experience can provide a rich form of graphical and audio entertainment that requires little initial commitment. The spectator experience also is a great way to get gently introduce spectators into the often-complex games that are currently being played. With more engaging experience, more people may be willing to watch a new game. As the size of an audience for a game builds, there will be significant worthwhile of opportunities for advertisement, merchandizing, and cross promotion between games and game accessories, such as PCs, game consoles, etc. If the spectator experience is sufficiently entertaining, some users might buy an entertainment appliance mainly for watching games as spectators.

As described herein, the experience for spectators can be made much richer by employing techniques often used in sports broadcasting, such as a commentator providing analysis and background stories, slow motion and instance replay. For 3D games, cinematic camera movements and shot cuts be much more visually interesting than the first-person views often provided to the players. Spectators can be more easily targeted for advertising, such as product placement, banner ads, etc. Finally, supporting the spectator experience may help drive sales of the games themselves, as casual viewers take the next step to become players.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for providing a spectator experience of an event, comprising:
   a spectator engine that aggregates selected portions of an event-related information and real-time spectator data that includes non-participant initiated event-related information, the non-participant initiated event-related information is generated between a non-participant and one of a participant and a disparate non-participant; and
   a distribution system that transforms the real-time spectator data into a representation of the spectator experience, the spectator experience customized based at least in part on a spectator preference or spectator parameters.

2. The system of claim 1, the spectator engine further comprises a viewing control that implements a cinematographic feature relative to the real-time spectator data.

3. The system of claim 2, the spectator engine further comprises a plurality of virtual cameras, each of the virtual cameras selectively animates associated portions of the real-time spectator data based at least in part upon the viewing control.

4. The system of claim 3, the viewing control automatically selects one of the virtual cameras based at least in part upon a camera selection algorithm.

5. The system of claim 1, the real-time spectator data comprises an indication of a number of users associated with the spectator experience.

6. The system of claim 5, the spectator data further comprises data that provides the spectator experience with at least one of an audio and visual representation indicative of the number of spectators associated with the event.

7. The system of claim 5, the spectator data further comprises data that provides the spectator experience with at least one of an audio and visual representation of previously associated users of the spectator experience for the event.

8. The system of claim 1, further comprising a portal that facilitates posting information based at least in part on the real-time spectator data onto a network.

9. A system for providing a spectator experience for an electronic game comprising:
   means for receiving game data corresponding to an occurrence of the electronic game;
   means for receiving spectator data that is based at least in part upon a spectator view of the occurrence, the spectator data is generated between a spectator and one of a participant and a disparate spectator;
   means for aggregating the game data with the spectator data;
   means for rendering the spectator experience based at least in part upon the aggregated data; and
   means for customizing the spectator experience based at least in part on a spectator preference or spectator parameters.

10. The system of claim 9, further comprising means for generating the game data and the spectator data in real-time.

11. The system of claim 9, further comprising means for dynamically selecting the spectator view based at least in part upon a predefined camera selection algorithm.

12. The system of claim 11, the means for dynamically selecting the spectator view is based at least in part on a spectator preference.

13. The system of claim 11, the means for dynamically selecting the spectator view is based at least in part upon on a manual instruction.

14. The system of claim 11, farther comprising means for determining a number of spectators; the means for rendering the spectator experience incorporates the number of spectators.

15. A method for providing a spectator experience associated with an event, comprising:
   receiving event information that corresponds to an occurrence of the event;
   selecting a portion of the event information;
   aggregating the selected portion of the event information with non-participant initiated information that corresponds to the occurrence, the non-participant initiated information is generated between a spectator and one of a participant and a disparate spectator;
   rendering the spectator experience that includes the aggregated information; and
   customizing the spectator experience based at least in part on a spectator preference or spectator parameters.

16. The method of claim 15, farther comprising receiving the event information in real-time with respect to the occurrence.

17. The method of claim 16, the non-participant initiated information includes an indication of a number of spectators of the spectator experience.

18. The method of claim 17, farther comprising rendering the indication of the number of spectators of the spectator experience.

19. The method of claim 18, farther comprising identifying one or more spectators and rendering the identification of the one or more spectators.

20. The method of claim 15, the act of rendering the spectator experience further comprises rendering a spectator view based at least in part upon the occurrence.

* * * * *

UNITED STATES PATENT AND TRADEMARK OFFICE
CERTIFICATE OF CORRECTION

Page 1 of 1

PATENT NO. : 7,446,772 B2
APPLICATION NO. : 11/311870
DATED : November 4, 2008
INVENTOR(S) : Curtis G. Wong et al.

It is certified that error appears in the above-identified patent and that said Letters Patent is hereby corrected as shown below:

In column 22, line 21, in Claim 14, delete "farther" and insert -- further --, therefor.

In column 22, line 39, in Claim 16, delete "farther" and insert -- further --, therefor.

In column 22, line 45, in Claim 18, delete "farther" and insert -- further --, therefor.

In column 22, line 48, in Claim 19, delete "farther" and insert -- further --, therefor.

Signed and Sealed this
Third Day of May, 2011

David J. Kappos
*Director of the United States Patent and Trademark Office*